(12) United States Patent
Schopp

(10) Patent No.: US 11,039,486 B2
(45) Date of Patent: Jun. 15, 2021

(54) SYSTEM, METHOD AND COMPUTER PROGRAM PRODUCT FOR SECURE BLUETOOTH CRYPTOGRAPHY IN A VIRTUAL MOBILE DEVICE PLATFORM

(71) Applicant: Intelligent Waves LLC, Reston, VA (US)

(72) Inventor: Joel Howard Schopp, Austin, TX (US)

(73) Assignee: Hypori LLC, Reston, VA (US)

( * ) Notice: Subject to any disclaimer, the term of this patent is extended or adjusted under 35 U.S.C. 154(b) by 392 days.

(21) Appl. No.: 15/886,346

(22) Filed: Feb. 1, 2018

(65) Prior Publication Data

US 2018/0219672 A1     Aug. 2, 2018

Related U.S. Application Data

(60) Provisional application No. 62/453,866, filed on Feb. 2, 2017, provisional application No. 62/460,424, filed on Feb. 17, 2017.

(51) Int. Cl.
*H04W 76/10*     (2018.01)
*H04L 9/08*     (2006.01)
(Continued)

(52) U.S. Cl.
CPC ............ *H04W 76/10* (2018.02); *G06F 9/452* (2018.02); *G06F 9/45558* (2013.01); *H04L 9/0816* (2013.01); *H04L 9/3213* (2013.01); *H04L 63/0428* (2013.01); *H04L 63/08* (2013.01); *H04L 67/10* (2013.01); *H04L 67/145* (2013.01);
(Continued)

(58) Field of Classification Search
CPC ..... H04L 9/0816; H04L 9/3213; H04L 63/08; H04L 63/20; H04L 63/0428; H04L 67/145; H04L 67/10; H04L 2209/80; H04W 12/06; H04W 4/80; H04W 84/18; H04W 76/10; H04W 12/0027; G06F 9/452; G06F 9/45558; G06F 2009/45579; G06F 2009/45595
See application file for complete search history.

(56) References Cited

U.S. PATENT DOCUMENTS 8,798,541 B1 * 8/2014 Scott .................... G06F 9/45545
                                               455/41.2
9,215,075 B1 * 12/2015 Poltorak ............... H04L 9/3268
(Continued)

*Primary Examiner* — Kevin Bechtel
*Assistant Examiner* — Hamid Talaminaei
(74) *Attorney, Agent, or Firm* — Pillsbury Winthrop Shaw Pittman LLP

(57) ABSTRACT

Embodiments are disclosed that allow encrypted data to be sent between a Bluetooth enabled device and a virtual device associated with a corresponding physical device. In particular, a Bluetooth implementation on the physical device may include one or more raw interfaces to facilitate endpoint to endpoint secure Bluetooth cryptography. Using these raw interfaces, an encrypted Bluetooth channel may be established directly between the virtual device and the Bluetooth enabled device using the radio of the physical device, where data may be encrypted and decrypted at an endpoint of the Bluetooth communication channel (such as at the virtual device or the Bluetooth enabled device) and passed through a Bluetooth implementation on the physical device without any additional encryption or decryption being performed on that data.

18 Claims, 11 Drawing Sheets

(51) Int. Cl.
  *H04L 29/06*    (2006.01)
  *H04W 4/80*    (2018.01)
  *G06F 9/455*    (2018.01)
  *H04W 12/37*   (2021.01)
  *H04L 29/08*    (2006.01)
  *H04L 9/32*     (2006.01)
  *G06F 9/451*    (2018.01)
  *H04W 12/06*   (2021.01)

(52) U.S. Cl.
  CPC ... *H04W 12/37* (2021.01); *G06F 2009/45579* (2013.01); *G06F 2009/45595* (2013.01); *H04L 63/20* (2013.01); *H04L 2209/80* (2013.01); *H04W 4/80* (2018.02); *H04W 12/06* (2013.01)

(56) References Cited

U.S. PATENT DOCUMENTS

| | | | |
|---|---|---|---|
| 9,942,051 B1* | 4/2018 | Poltorak | H04L 63/04 |
| 2017/0005820 A1* | 1/2017 | Zimmerman | G05B 15/02 |
| 2017/0201886 A1* | 7/2017 | Yang | H04W 12/35 |

* cited by examiner

FIG. 7
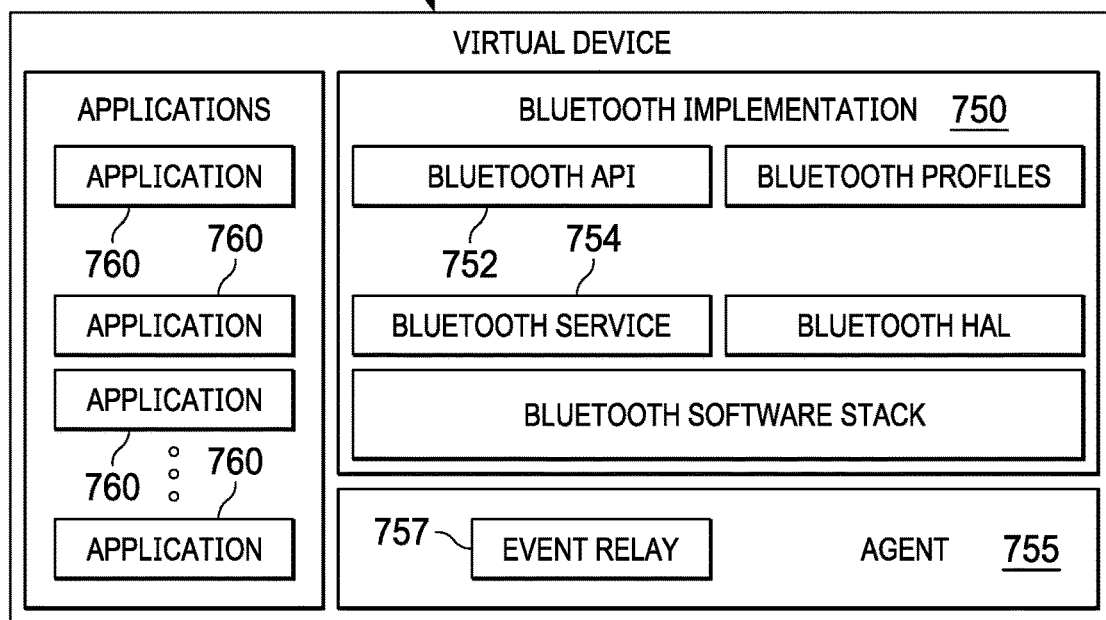
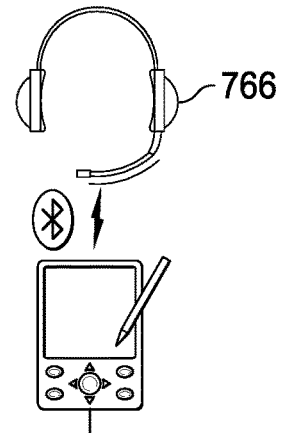

SYSTEM, METHOD AND COMPUTER PROGRAM PRODUCT FOR SECURE BLUETOOTH CRYPTOGRAPHY IN A VIRTUAL MOBILE DEVICE PLATFORM

RELATED APPLICATION(S)

This application claims a benefit of priority under 35 U.S.C. § 119 from U.S. Provisional Patent Application No. 62/453,866 filed on Feb. 2, 2017, by inventor Joel Howard Schopp, entitled "SYSTEM, METHOD and COMPUTER PROGRAM PRODUCT FOR SECURE BLUETOOTH CRYPTOGRAPHY IN A VIRTUAL MOBILE DEVICE PLATFORM," and U.S. Provisional Patent Application No. 62/460,424 filed on Feb. 17, 2017, by inventor Joel Howard Schopp, entitled "SYSTEM, METHOD and COMPUTER PROGRAM PRODUCT FOR IMPLEMENTING BLUETOOTH IN A VIRTUAL MOBILE DEVICE PLATFORM," the entire contents of which are hereby fully incorporated by reference herein for all purposes.

TECHNICAL FIELD

This disclosure relates generally to a virtual mobile device platform for mobile devices. In particular, embodiments disclosed herein relate to a systems, methods, and computer program products for security in a virtual mobile device platform. More specifically, embodiments disclosed herein relate to systems, methods and computer program products for increasing the security of Bluetooth® communications in a virtual mobile device platform.

BACKGROUND

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic, even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives—still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements.

SUMMARY

Embodiments as disclosed herein provide a system, method, and computer program product that may generate remote views in a virtual mobile device platform. In some embodiments, events from a physical mobile device are sent to a virtual device. The virtual device creates one or more views based on the received events. Graphical attributes of one or more of the created views are captured and sent to the physical mobile device. Remote views are constructed and displayed on the physical mobile device based on the attributes received from the virtual device. For views where graphical attributes are not captured, compressed video of the respective views can be sent to the physical mobile device. Embodiments disclosed herein can provide many advantages. For example, in some embodiments, generating remote views using graphical attributes improves the responsiveness of remote applications, as well as reduces video bandwidth consumption.

However, the generation of these remote views alone may not address all security concerns. In particular, as discussed, the physical device could be accessed or otherwise compromised in a variety of ways. As but one example, a user may have downloaded an infected application or could be sent an infected document via email or instant messaging, or accessed an infected service. Such an infected device could therefore compromise unencrypted data on the device.

Such a security hole manifests itself in the use of Bluetooth® enabled devices (e.g., Classic Bluetooth®, Bluetooth High Speed®, Bluetooth Low Energy® or other Bluetooth® implementations) in association with the physical device. In current Bluetooth® implementations the Bluetooth® implementation (e.g., protocol stack) on mobile devices establishes an encryption key for use with a Bluetooth® enabled device and communications between the Bluetooth® enabled device and the physical device are encrypted with this key. The unencrypted communicated data can then be provided to an application at the physical device. In the context of the virtual mobile device platform, the data may once again be encrypted at an application on the physical mobile device to be provided to the virtual mobile device at the virtual mobile device platform. The communication of the unencrypted data from the Bluetooth® implementation to the application on the physical device is therefore problematic; if the physical device has been compromised then this unencrypted data may be intercepted during this communication and likewise compromised.

It would therefore be desirable if the Bluetooth® encryption could be maintained between the Bluetooth® enabled device where the data originates (or where the data is destined) and the endpoint destination (or originating endpoint). In the context of the virtual mobile device platform, then, it would be desirable if the data could remain encrypted between the Bluetooth® enabled device and the virtual mobile device. While it is in this context that embodiments may be explained, it will be understood by those of ordinary skill in the art that other embodiments may be equally usefully applied to achieve such secure Bluetooth® cryptography with respect to an endpoint that is an application on a physical device such that Bluetooth® encryption is maintained between the Bluetooth® enabled device and the application on the physical device.

In particular, a Bluetooth® library on a physical device may include one or more interfaces to facilitate endpoint to endpoint secure Bluetooth® cryptography. These interfaces may include a connection or key exchange interface such that the connection or key exchange communications for the Bluetooth® protocol being utilized may be passed through the Bluetooth® library on the physical mobile device, allowing connection or key exchange to be performed directly between the two endpoints without the participation of the Bluetooth® library on the physical device in this portion of the connection process. These interfaces may also include a raw data exchange interface such that data may be read or written to an input stream or output stream of a Bluetooth® connection without encryption being performed by the Bluetooth® library on the physical device. In this manner an encrypted Bluetooth® channel is established directly between two endpoints, where data may be encrypted and decrypted at an endpoint of the Bluetooth® communication channel (such as at the virtual mobile device or the Bluetooth® enabled device) and passed through the Bluetooth® implementation on the physical device to the Bluetooth® endpoint without any additional encryption or decryption being performed on that data.

Other interfaces that may be included could be interfaces for key sharing between an endpoint and the Bluetooth® library on the physical device for shared access purposes (e.g., so the Bluetooth® library may have the ability to encrypt or decrypt data with this key) or for debugging purposes.

Accordingly, embodiments as disclosed herein may achieve the advantage of increasing the security of Bluetooth® communications, as data communicated over the Bluetooth® channel may not exist in an unencrypted form anywhere outside the endpoints of the communication channel (e.g., such as when being passed from the Bluetooth® library on the physical device to an application on the physical device).

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 7 depicts a diagrammatic representation of one embodiment of secure Bluetooth® cryptography for use in a virtual mobile device platform.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, a mobile device lives in a hostile world and, as such, securing the device itself may not be enough and/or possible. There is a desire to separate a physical device from applications that run on the device. Embodiments disclosed herein can remove the applications and services, even much of the device's operating environment from the hostile environment. Instead, these functions are provided on protected hardware and software in a data center where they can be managed, monitored, repaired, and deployed under the care of information technology (IT) experts and administrators.

Figure 1:
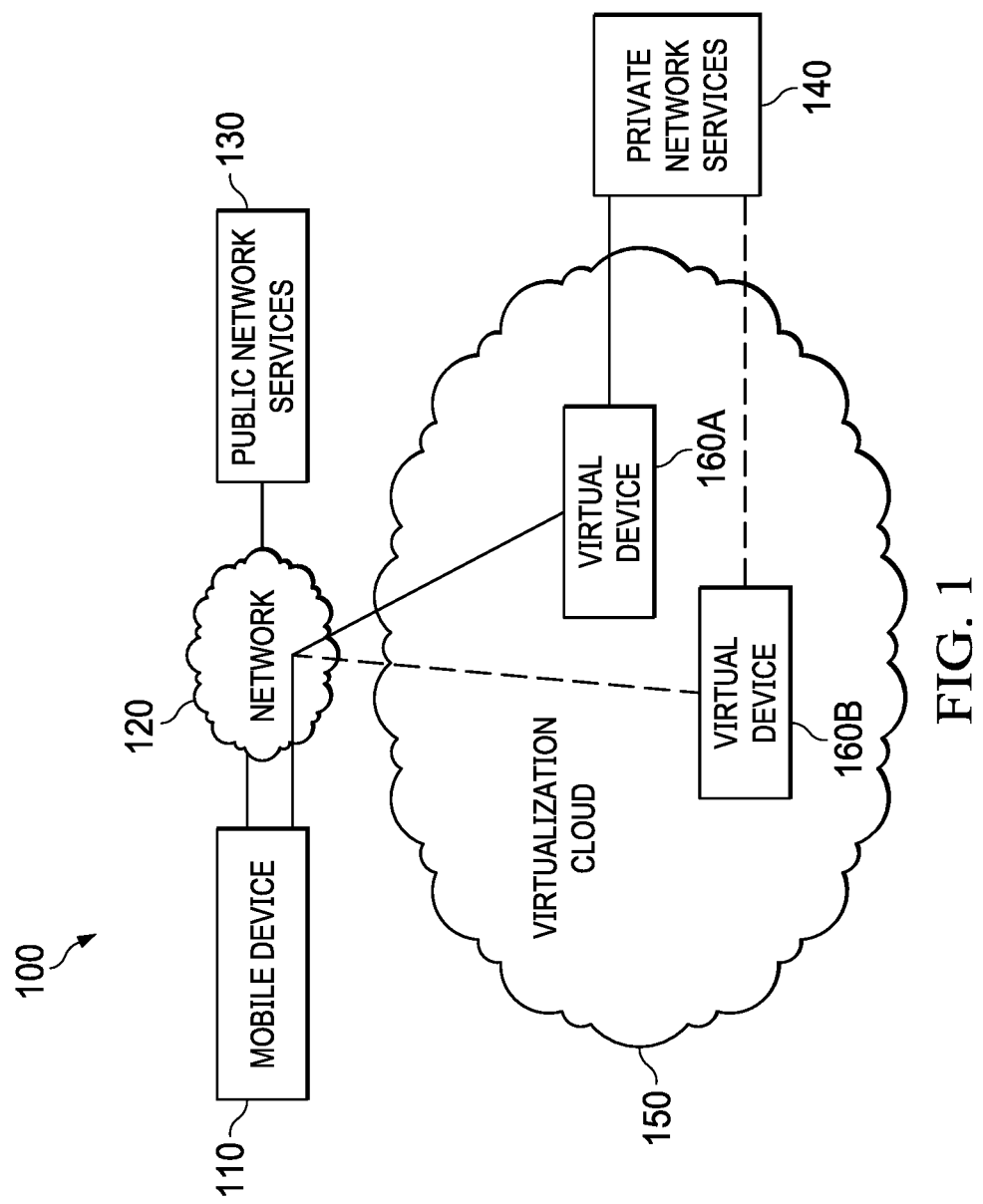
FIG. 1 depicts a diagrammatic representation of an example of an overall network environment in which embodiments disclosed herein may be implemented.

As illustrated in FIG. 1, embodiments disclosed herein can allow a user of mobile device 110 in network environment 100 to switch between using public network services 130 and using private network services 140. In particular, the user may access public network services 130 via public network 120 such as the Internet over which non-sensitive information may be communicated. However, to access private network services 140, a virtualization cloud client application (referred to hereinafter as a "VC client application" or "client application") running on mobile device 110 connects to a virtualized device (e.g., virtual device 160A) hosted in virtualization cloud 150 and brokers access to private network services 140 as well as local device functions.

Those skilled in the art will appreciate that local device functions may vary depending upon the type of mobile device 110. For example, mobile device 110 can be a touchscreen smartphone with local device functions such as the touch screen, the dialer/phone network, camera, Global Positioning System (GPS), keyboard, speakers, microphone, and so on. Other examples of mobile device 110 may include touchscreen tablets and other touch-enabled mobile devices. As will be explained in further detail below, such mobile device functions can be provided by embodiments disclosed herein on protected hardware and software in virtualization cloud 150 without adversely affecting the user's experience in interacting with mobile device 110, even if the user travels frequently from one continent to another.

In some embodiments, multiple virtualized devices may be created for the same physical device. For example, in FIG. 1, virtual device 160A and virtual device 160B may be created for mobile device 110. This feature is further described below with reference to FIG. 2.

Figure 2:
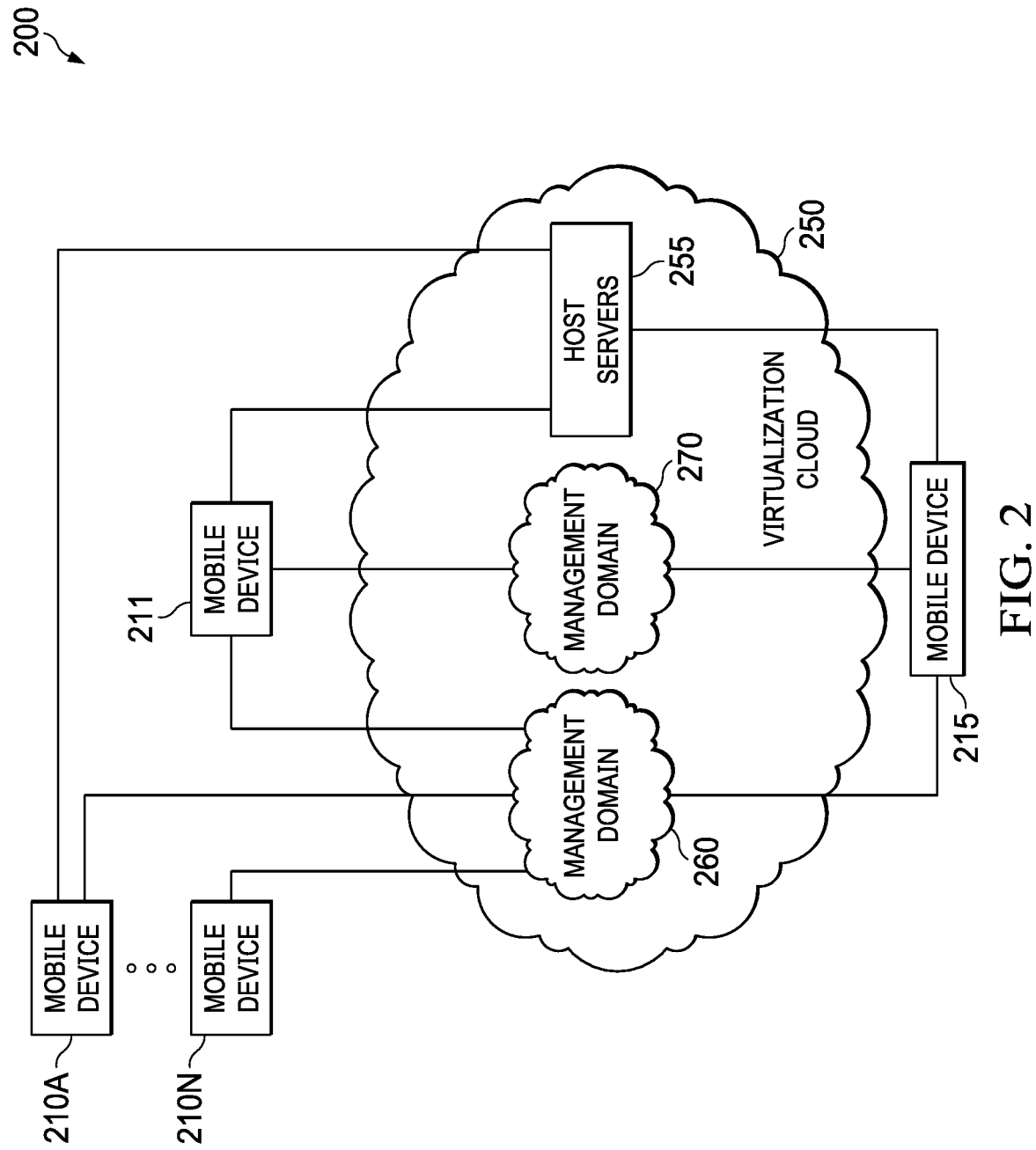
FIG. 2 depicts a diagrammatic representation of an example of a network architecture according to one embodiment.

FIG. 2 depicts a diagrammatic representation of an example of a network architecture according to one embodiment. In this example, system 200 may include virtualization cloud 250 communicatively connected to various types of mobile devices 210A . . . 210N, 211, and 215. Mobile devices 210A . . . 210N, 211, and 215 may represent different types of actual touchscreen devices such as smartphones and tablets. Mobile devices 210A . . . 210N, 211, and 215 may be owned by the same or different entities (e.g., enterprises, users, etc.). Further, mobile devices 210A . . . 210N, 211, and 215 may be programmed with different operating systems such as iOS®, Android®, and Windows®.

Each of mobile devices 210A . . . 210N, 211, and 215 may have a VC client application installed, for instance, by an administrator or IT personnel of system 200. In one embodiment, a VC client application may be downloaded from an online device-specific app store.

In one embodiment, a VC client application may comprise software that brokers access to mobile devices' physical interfaces (e.g., soft and hard keyboards, touchscreen, GPS, camera, accelerometer, speakers, microphone, phone dialer, etc.) and Virtual Private Network (VPN) software that connects across a public network such as the Internet to servers in a virtualization cloud (e.g., virtualization cloud 150 of FIG. 1) over encrypted network interfaces. Virtualization cloud 250 may be an embodiment of virtualization cloud 150 described above with reference to FIG. 1.

Virtualization cloud 250 provides a hosted, networked, application environment. As a non-limiting example, in one embodiment, virtualization cloud 250 is configured as an Android® application environment. As illustrated in FIG. 2, virtualization cloud 250 may comprise host servers 255 and management domains 260, 270.

Host servers 255 may host application services. Private network services 140 of FIG. 1 may be an embodiment of application services hosted by host servers 255 of FIG. 2. In one embodiment, a plurality of application services may execute on a collection of servers with extensions to support separation and segmentation of a core server.

Each management domain may comprise a collection of virtualized devices, hosted on one or more server machines. In an Android® application environment, such virtualized devices may be referred to as virtual Android® devices. From another perspective, a management domain is made up of a collection of server machines providing services to a large number of users. A collection of server machines may host virtual devices for these users and provide access to the applications and services via a remote client interface. In some embodiments, a management domain may further comprise a private application "store" for hosting installable approved enterprise applications particular to that management domain. In some embodiments, a user can have access to one or more "virtual devices" hosted in the management domain, each virtual device containing a core set of applications such as an enterprise address book, mail, calendar, web browser, etc. in addition to any preinstalled enterprise applications.

As FIG. 2 exemplifies, each mobile device (e.g., mobile device 210A, mobile device 211, mobile device 215, etc.) has a connection (via a VC client application installed thereon) to one or more server machines that host their virtual device(s) in a virtualization cloud (e.g., virtualization cloud 250). As explained below, the applications and their data located within a single virtual device are completely inaccessible to the applications and data in another virtual device. The applications are limited to the network services within their management domain and thus cannot access the network services provided in other management domains. For example, mobile device 210A may have a first virtual device hosted on a first server machine in management domain 260 and a second virtual device hosted on a second server machine in management domain 270. However, the applications and their data located within the first virtual device in management domain 260 are completely inaccessible to the applications and data within the second virtual device in management domain 270.

In some embodiments, for each connection to an application service hosted in the virtualization cloud, a different instance of the VC client application is started on the mobile device. For example, a first VC client instance may be started on mobile device 210A to access management domain 260 and a second VC client instance may be started on mobile device 210A to access management domain 270. All of the applications running in a particular management domain for a particular user will be accessed through the corresponding VC client application running on the mobile device. Additionally, the VC client application's remote connection software running in a mobile device does not expose application generated events running natively within the mobile device to the applications running in their virtual device(s), unless they are specific events from the devices brokered by the VC client application. In this way, rather than executing mobile applications in an actual device (e.g., mobile device 210A, etc.), the applications are run remotely in a virtualization cloud (e.g., virtualization cloud 250) under the watchful eyes of an enterprise's systems and network management tools and their administrators, separate from each other and from the consumer/Internet applications and data.

Figure 3:
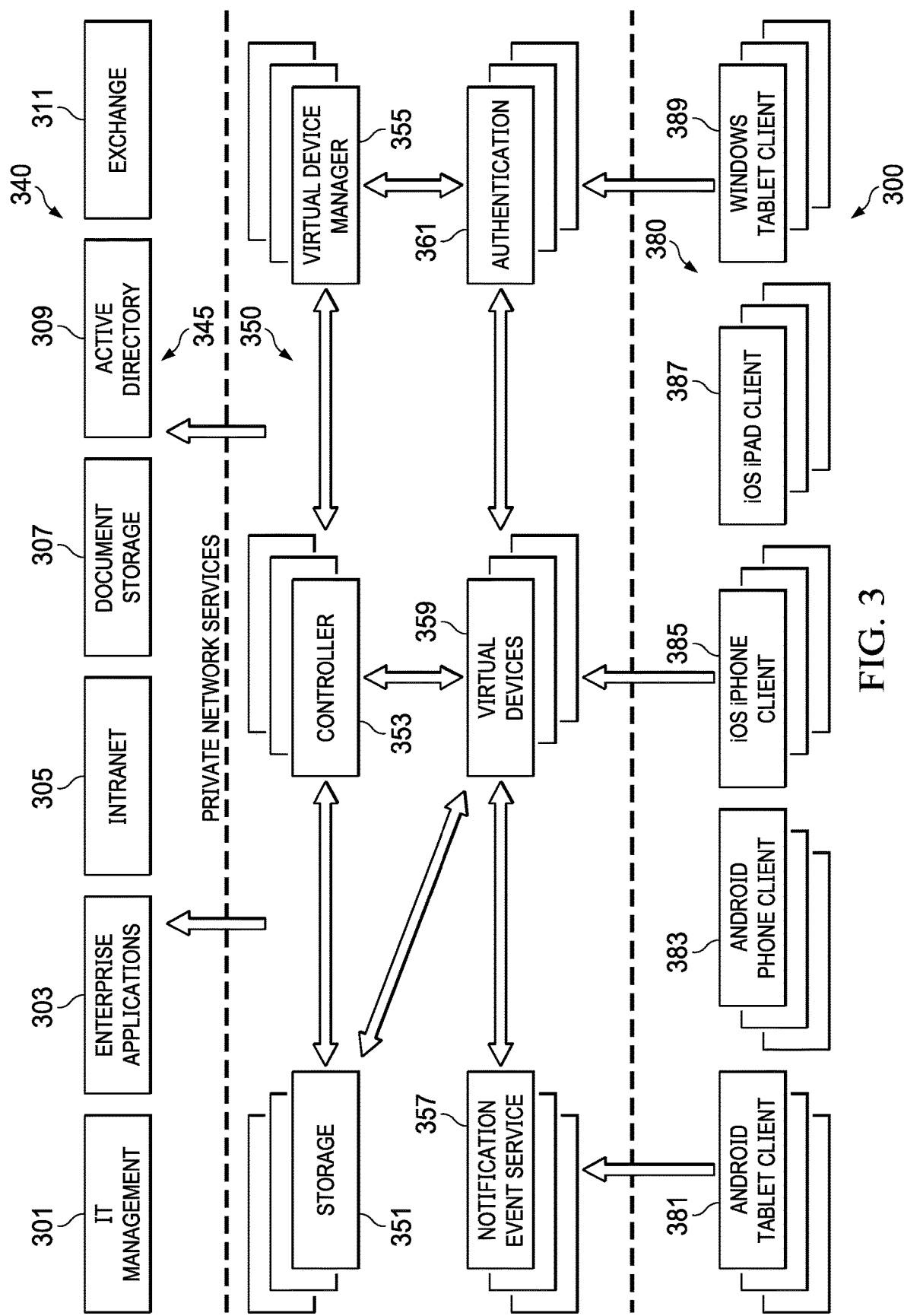
FIG. 3 depicts a diagrammatic representation of an example of a system architecture according to one embodiment.

Turning now to FIG. 3, which depicts a diagrammatic representation of an example of a system architecture according to one embodiment. In this example, system 300 comprises virtualization cloud 350 communicatively connected to private network services 340 and various types of mobile devices 380.

Mobile devices 380 may operate in a distributed computing environment and may operate on various types of operating systems. Similar to mobile devices 110, 210A . . . 210N, 211, 215 described above, each of mobile devices 380 may have a VC client application installed thereon. The installed VC client application may be device-specific. For example, each of Android® tablets 381 may have an Android client, each of Android phones 383 may have an Android phone client, each of iOS iPhones® 385 may have an iOS iPhone® client, each of iOS iPads® 387 may have an iOS iPad® client, and each of Windows® tablets 389 may have a Windows® tablet client.

Private network services 340 may comprise enterprise services for private network 345. Non-limiting examples of private network services 340 may include IT management 301, enterprise applications 303, intranet 305, document storage 307, active directory 309, and email exchange 311. These services are known to those skilled in the art and thus are not further described herein.

Virtualization cloud 350 may comprise a plurality of system components, including storage 351, controller 353, virtual device manager 355, notification event service 357, virtual devices 359, and authentication 361. These system components may run on a single server machine or separately on multiple server machines. For the sake of convenience, and not of limitation, FIG. 3 shows each system component running on multiple physical servers.

More specifically, virtual device manager 355 (an application that manages virtual devices) may send a command to controller 353 to create a virtual device. In one embodiment, controller 353 may implement the OpenStack open source cloud computing fabric controller. OpenStack is known to those skilled in the art and thus is not further described herein for the sake of brevity.

In response to the command from virtual device manager 355, controller 353 may first select a golden image, and any applications associated with the golden image. A golden image refers to a virtual machine that was built as a template and that usually contains little, if any, more than the base operating system. A golden image may also be referred to as a gold image, clone image, master image or base image. To create a golden image, an administrator first sets up the computing environment exactly the way it is needed and then saves the disk image as a pattern for making more copies. The use of golden images can save time and ensure consistency by eliminating the need for repetitive configuration changes and performance tweaks. This approach can be compared to automated replication, which requires a configuration management tool to build new images on demand. In a self-service provisioning environment, a collection of golden images may be referred to as a golden repository, gold catalog or golden image library.

Using the selected golden image, controller 353 may create virtual device instance 359 and associate with it a storage location in storage server 351. Storage server 351 holds the persisted, physical storage of each virtual device created by controller 353. Controller 353 may then return the information on virtual device instance 359 to virtual device manager 355.

In some embodiments, each user is assigned one or more virtual devices in one or more management domains when they are provisioned. These virtual "devices" contain applications, their settings and device configuration, as well as any data created locally in the device for the user by any installed applications. The images are maintained in network storage servers (e.g., storage servers 351) within the corresponding management domain(s). In some embodiments, as part of this image, the user is provided an emulated "flash" drive for app storage. The images can also be configured to permit access to external enterprise storage. In some embodiments, storage servers may utilize redundant storage to protect data from failures.

In some embodiments, authentication servers 361 may be configured to provide authentication and session management services. For example, when a user (via a VC client application running on a mobile device that the user is using) attempts to access an enterprise application, authentication server 361 may connect to one or more directory servers (e.g., active directory 309) to authenticate the user's access to virtual device(s) where the enterprise application can be run and to provision the user with one or more virtual devices. After the user authenticates, authentication server 361 may direct virtual device manager 355 to locate a device server that will host the user's virtual device 359. In some embodiments, it may ensure that virtual device 359 is "powered on" as well as initiate the initial session negotiation (via establishment of security tokens) between the mobile device running the VC client application and virtual device 359.

Those skilled in the art will appreciate that a virtual "device" is a not really a device—it is a remote execution environment for all of the services and applications that make up a device. There are (at least) two main classes of device servers, "bare metal" device servers and virtual machine device servers. There are some functional, deployment, and cost differences between these types and so ultimately implementation and market demand will determine their allocation and availability.

The bare metal device servers are made up of a large number of relatively small processing units similar in performance and scale to the processing units of actual mobile devices. Each virtual device instance can run on its own physical central processing unit ("CPU") hardware. In some embodiments, a modified version of the Simple Protocol for Independent Computing Environments (SPICE) protocol server software executes directly in the operating system (OS) on each of these instances to provide remote access.

SPICE is an open source protocol and implementation developed by Red Hat that provides remote access to virtual desktops. SPICE has a well-documented protocol that includes the ability to create new "channels" for different remote services. Embodiments extend the SPICE protocol to provide remote access to virtual devices and to broker access to the sensors of the real (physical) devices.

Virtual machine device servers are server class machines that can be found in the server market today. On the virtual machine device servers, each virtual "device" executes in its own virtual machine on a specially configured Linux® device server. In some embodiments, a device server may be configured to provide Transport Layer Security (TLS) and VPN encryption, virtual device instrumentation/auditing, integrity checks and anti-virus from virtualization layer, system-side application management, learning of 'normal' behavior, protocol aware firewall, server-side TPM attestation, SELinux-Based® virtual device separation, VPN service for applications in the virtual devices, and network proxy for traffic monitoring. Some of these features are further explained below.

In some embodiments, virtual devices hosting Android® (or Security Enhancements for Android® (SEAndroid®)) may be created for each user using Linux's Kernel-based Virtual Machine® (KVM) and Quick EMUiator® (QEMU).

KVM refers to a kernel-resident virtual machine infrastructure built directly into Linux® as opposed to other virtualization techniques that run under Linux® as a process. This architecture helps KVM operate very efficiently within Linux®. KVM provides completely separate virtual environments for Android® devices implementing embodiments disclosed herein. KVM itself does not provide any hardware emulation or remoting capabilities.

QEMU is a user-space emulator that works with KVM to provide the hardware emulation. While QEMU can provide processor instruction emulation, embodiments may employ it only for emulating hardware for the virtual device. For example, some embodiments use or provide emulated hardware for touch screen/display, memory/storage, audio, cameras, sensors, bypass, and networking.

Linux® and KVM provide the isolation between each user and the applications that they run. It is not possible to communicate directly between the application components and services in these separate virtual containers. Thus, each "device", while sharing physical server hardware, runs independently and is separate from the others, as depicted in FIG. 4.

Figure 4:
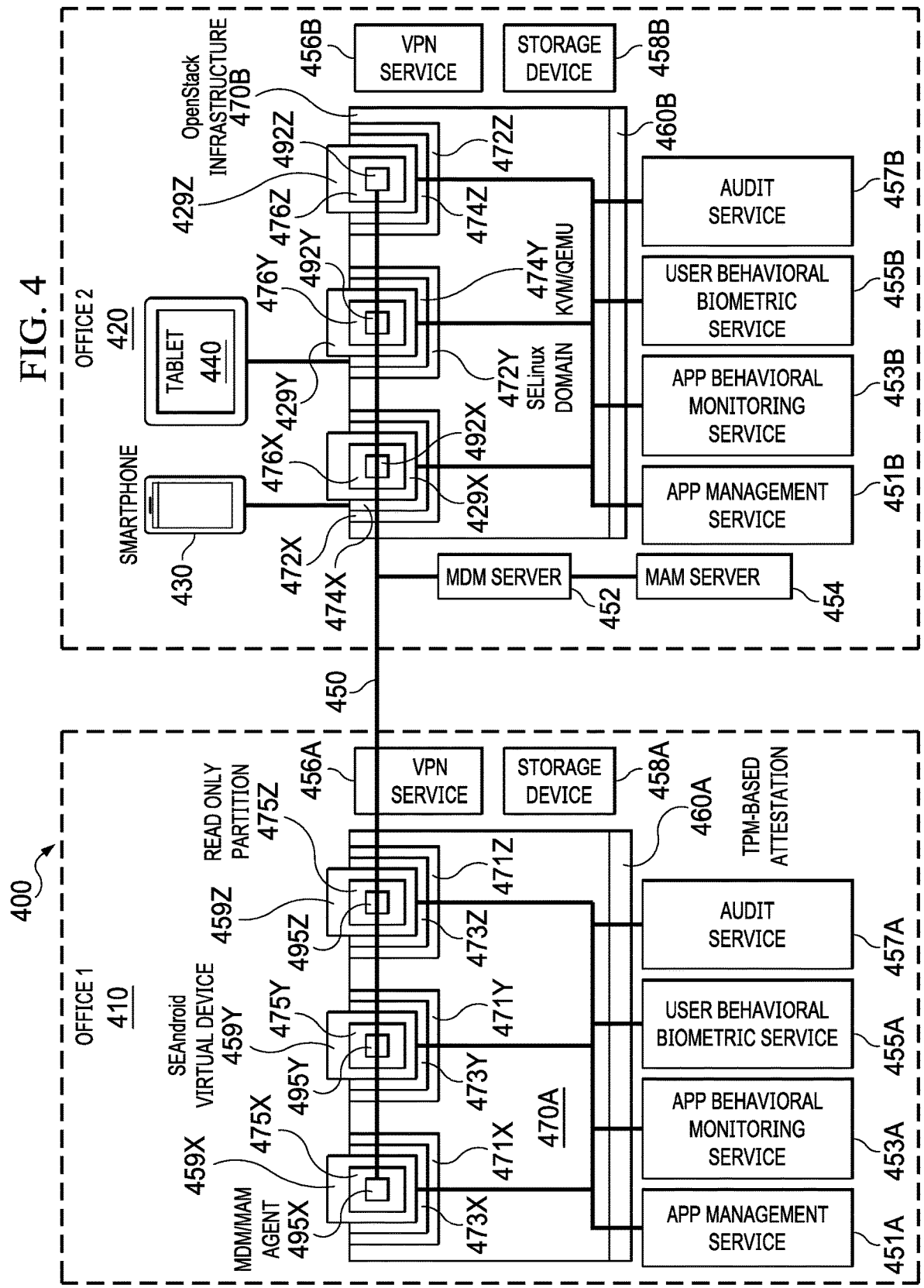
FIG. 4 depicts a diagrammatic representation of an example of virtual device containment and connections according to one embodiment.

FIG. 4 depicts a diagrammatic representation of an example of virtual device containment and connections according to one embodiment. In this example, virtualization cloud 400 may comprise management domain 410 (Office 1) and management domain 420 (Office 2).

Management domain 410 and management domain 420 may be hosted on device servers connected to management network 450 which provides a plurality of network services such as application management services 451A, 451B, application behavioral monitoring services 453A, 453B, user behavioral biometric services 455A, 455B, and audit services 457A, 457B.

Management domain 410 may comprise a plurality of virtual devices 459X, 459Y, 459Z implemented using OpenStack® infrastructure 470A on Trusted Platform Module (TPM)-based attestation 460A. Each of the plurality of virtual devices 459X, 459Y, 459Z may include an agent of management network 450 (e.g., agents 495X, 495Y, 495Z, respectively). In some embodiments, the agent may be referred to as a mobile device management and mobile application management (MOM/MAM) agent. In this example, management domain 410 may further comprise VPN service 456A and storage service 458A.

Management domain 420 may comprise a plurality of virtual devices 429X, 429Y, 429Z implemented using OpenStack® infrastructure 470B on TPM-based attestation 460B. Each of the plurality of virtual devices 429X, 429Y, 429Z may include an agent of management network 450 (e.g., agents 492X, 492Y, 492Z, respectively). In this example, management domain 420 may further comprise MOM server 452, MAM server 454, VPN service 456B, and storage service 458B.

As illustrated in FIG. 4, each of the plurality of virtual devices 459X, 459Y, 459Z in management domain 410 and each of the plurality of virtual devices 429X, 429Y, 429Z in management domain 420 has a read only partition and its own KVM/QEMU in a particular SELinux® domain (e.g., read only partition 475X and KVM/QEMU 473X in SELinux® domain 471X, read only partition 475Y and KVM/QEMU 473Y in SELinux® domain 471Y, read only partition 475Z and KVM/QEMU 473Z in SELinux® domain 471Z, read only partition 476X and KVM/QEMU 474X in SELinux® domain 472X, read only partition 476Y and KVM/QEMU 474Y in SELinux® domain 472Y, read only partition 476Z and KVM/QEMU 474Z in SELinux® domain 472Z).

In the example of FIG. 4, the virtual devices are implemented as SEAndroid® virtual devices. SEAndroid® may provide benefits such as privileged daemon protection, application isolation, middleware controls, instrumentation and auditing, application install protection, limit application access to sensors, 'untrusted' application sandboxing, read-only core OS partition, centralized patching, and MOM/MAM controls.

Each of these virtual devices may be connected to a physical mobile device (e.g., smartphone 430, tablet 440, etc.). In some embodiments, a VC client application running on the physical device may be configured to provide remote two factor authentication, remote signing and decryption, TLS encryption for data in transit, GPS-based access policies, attributes exposed for MDM integration, mechanisms to improve attestation, and/or integration with the mobile device's Mobile Trusted Module (MTM).

When a user is added to a management domain, they are provisioned with a virtual device of a particular type. Similarly, when a user is removed, their virtual devices must be deactivated and their "parts" archived or reclaimed. A separate management server is used by administrators to manage the lifecycle of devices and users of a virtualization cloud (e.g., virtualization cloud 150, virtualization cloud 250, virtualization cloud 350, virtualization cloud 400, etc., collectively referred to hereinafter as the "VC system"). In some embodiments, provisioning services permit administrators to define device "types" (templates) and configurations and assign them to users depending upon the role or duty.

In some embodiment, the management of the VC system and the virtual devices can be controlled through a management policy system. Servers, storage, and virtual devices can be associated with hierarchically arranged policy containers. Policies and access to components can be controlled through these containers and their position in the hierarchy. In some embodiment, these policy containers may be referred to as policy domains and can be used to allocate and delegate control to multiple administration management domains.

For example, consider a hosted VC environment. A hosting partner wishes to support multiple enterprise customers in a single installation. At the same time, they would like to delegate much of the management to their customers. They may choose to create a single policy domain that contains shared resources such as common virtual device images, common device storage, and a shared pool of device servers. For each new customer, they create a sub-domain and grant administrative access to the customers' administrators for their respective sub-domain. In addition, they create a policy in the root domain that all resources are accessible to the sub-domains. The customers' administrators can now create assets (new device image templates, users, administrators, groups) within their own sub-domain. They, in turn, can create their own sub-domains and assign assets, users, groups, administrators, etc. to those sub-domains as well as policies to determine how resources can be inherited from the companies' sub-domain.

If one of these customers wants dedicated server resources to run the virtual devices or to maintain their storage, the hosting partner can add device server and storage server resources to their sub-domain(s) and thus only their virtual devices will be running or be saved on those server assets. Similarly, those systems might have different networking characteristics that would let them share a VPN connection to the enterprise as opposed to configuring a VPN within each of the virtual devices.

This organization can also be beneficial to enterprises that need to delegate management functions to different departments within their enterprise yet want to control and maintain the overall infrastructure centrally.

When migrating a user between two templates, the VC system can support intelligent upgrading, including:
Scheduling specific times for upgrades to occur.
Roll back to a previous device template if an error occurs.
Partial, incremental upgrade processes across a user population.
Detection of whether a user is active on a virtual device before enacting the upgrade.
Graceful shut down of a virtual device for which an upgrade is being forced.

As a non-limiting example, in some embodiment, a provisioning and management server for the virtual machine device servers described above can be built on top of a virtual datacenter management platform such as OVirt®, OpenStack®, or the like. OVirt® and OpenStack® are known to those skilled in the art and thus are not further described herein. OVirt® provides the underlying data services for managing and accessing virtual machines. The VC system provides an abstraction interface that hides much of the complexity of the underlying virtual datacenter management platform when trying to manage multiple management domains within a single system. In some embodiments, SPICE may be integrated into the virtual datacenter management platform, allowing users to connect to virtual machines through SPICE.

In some embodiments, an administrator might want to allow users to access a mobile virtual device without a persist state of the virtual device beyond a given user's session. In this case, the virtual device may be deleted when the session ends. In some embodiments, the virtual device may optionally warn the user that the virtual device is operating on a kiosk mode when the user logs in, and delete the virtual device when the user logs out. Essentially, the kiosk mode provides a 'fresh' virtual device based on a specified template each time a user logs in.

In a variant of the kiosk mode, a virtual device can be set to synchronize certain enterprise data (e.g., recent email) when the user logs into the kiosk mode device, but the virtual device is still deleted when the user logs out. In this way, any new enterprise data is placed back into the enterprise applications that should own each respective data type. This allows the user to move between server node clusters (e.g., moving between countries) without concern about moving or synchronizing virtual device state between the different servers.

The VC system may support additional modes of operation. For instance, a published app mode may enable an organization to offer specific applications in remote 'containers' to large user populations. An example would be a bank using the published app mode to make an online banking application available to its customers, while hosting that online banking application in their own data centers on their own locked down OS image.

In such a published app mode, the end client application icon can be customized to enable white labeling. For example, when the user logs in, the published application is already open and in focus. When the user quits the application, the remote connection closes. In some embodiments, the published app mode can be coupled with the kiosk mode described above such so that the virtual device does not have a persist state.

In some embodiments, an organization may wish to provision a virtual device (whether a full device, kiosk mode, published app, etc.) to a person not employed by that organization, and the user need only download a VC client application or add the account to their existing VC client application on their mobile device(s).

In some embodiments, an organization may wish to provision one or more virtual devices to one or more employees at a partner organization. In this case, the publishing organization can liaise with the consuming organization to add a VC client application and/or set of authentication settings to the consuming organization. One of the advantages of this approach is that the publishing organization can leverage the user provisioning and authentication mechanisms of the consuming organization. For example, access to the VC client application can become a setting in the consuming organization's active directory, and users in the consuming organization must already have authenticated to the consuming organization in order to have access to the publishing organization's applications/virtual devices.

In this scenario, doing two remoting steps would add latency and complexity to the VC system. To avoid this, when the user connects to the publishing organization's virtual device, the VC client application on the user's physical device can connect to the publishing organization's VC servers via a bypass channel in the VC server of the consuming organization.

As described above, SPICE can create new "channels" for different remote services. Different types of data can be communicated between a mobile device running a VC client application and a virtual device running in the VC system via different SPICE channels. These SPICE channels are mapped to virtual input/output channels.

Figure 5:
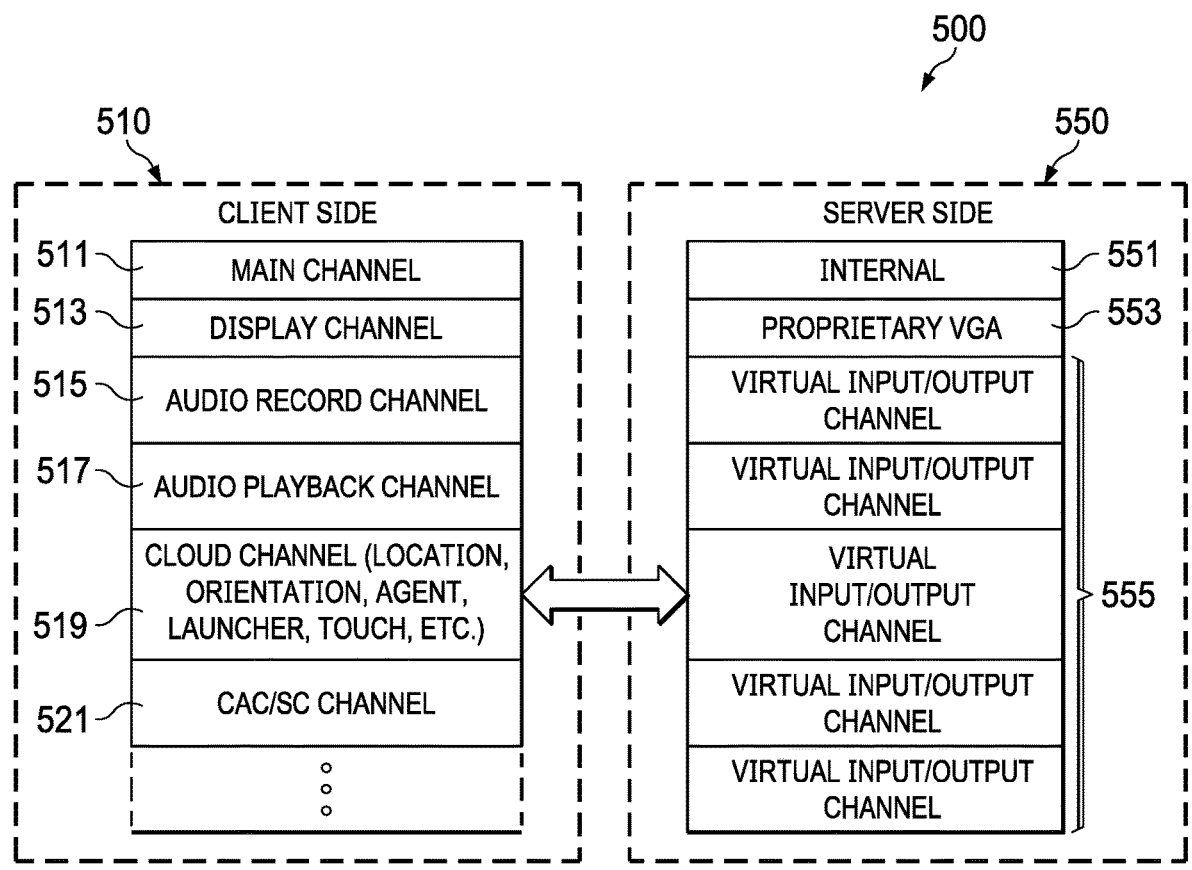
FIG. 5 depicts a diagrammatic representation of an example of a channel based device mapping architecture according to one embodiment.

FIG. 5 depicts a diagrammatic representation of an example of channel based device mapping architecture 500 according to one embodiment. In this example, data (e.g., display data, audio data, location data, etc.) may be communicated from a mobile device (e.g., client side 510) via various SPICE channels (e.g., main channel 511, display channel 513, audio record channel 515, audio playback channel 517, cloud channel 519, Call Admission Control (CAC)/Signaling Controller (SC) channel 521, Bluetooth® channel 523, etc.) to a server in the VC system (e.g., server side 550). Channel based device mapping architecture 500 may include a virtual device mapping module embodied on a non-transitory computer readable medium and configured for mapping the incoming data to appropriate virtual device component (e.g., internal component 551, proprietary video graphic adapter (VGA) 553, etc.) and/or virtual input/output channels 555, each associated with a particular virtual driver. This is further described below with reference to FIG. 6.

Figure 6:
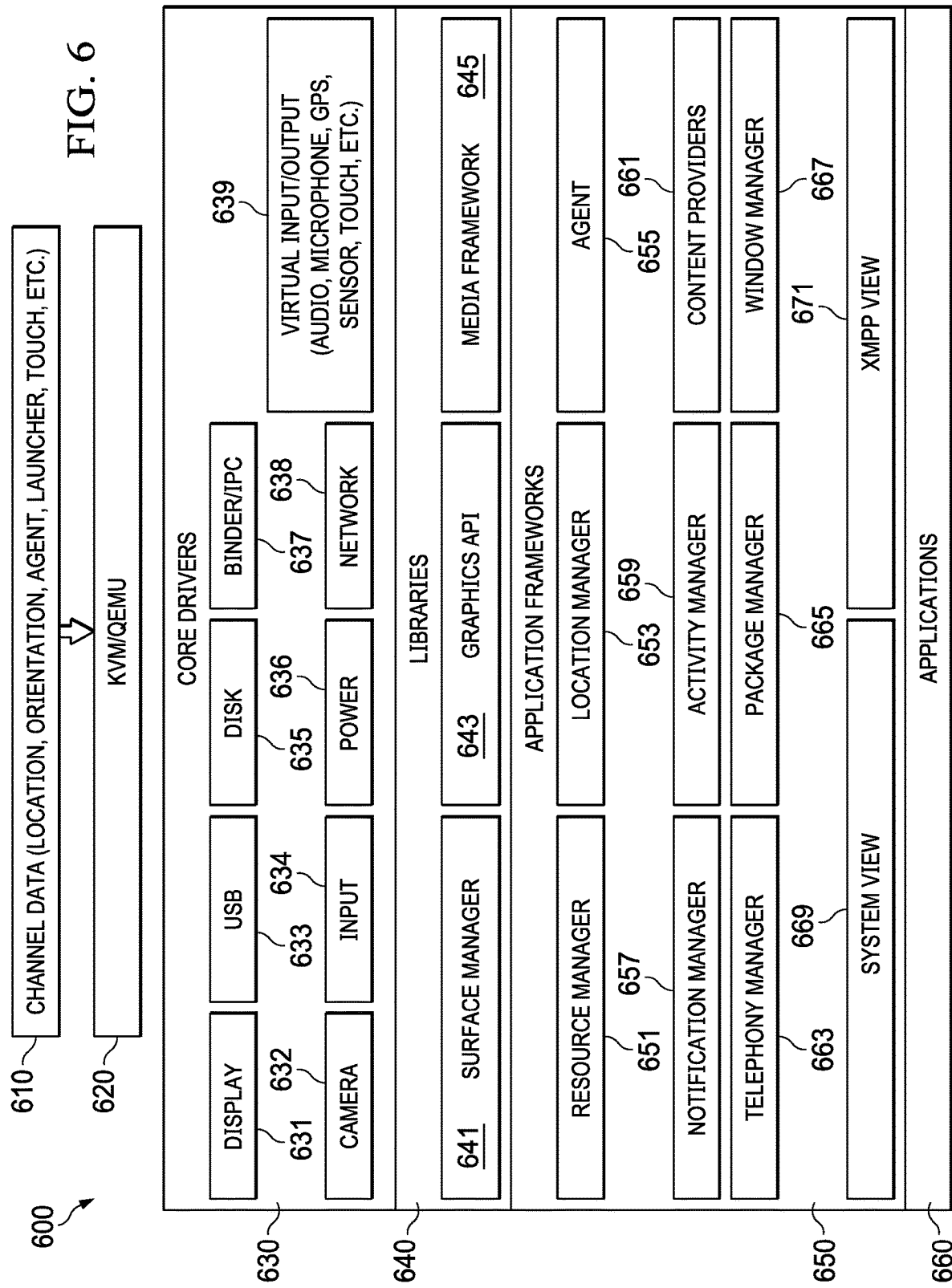
FIG. 6 depicts a diagrammatic representation of an example of virtualization server software architecture according to one embodiment.

FIG. 6 depicts a diagrammatic representation of an example of virtualization server software architecture according to one embodiment. As a non-limiting example, virtualization server software architecture 600 may implement a modified version of Android® OS.

As illustrated in FIG. 6, virtualization server software architecture 600 may comprise a plurality of software components. At its core is a Linux® kernel with specialized core drivers 630 to abstract the hardware layer from the application runtimes. Channel data 610 are received into a virtual device's KVM/QEMU 620, mapped via virtual input/output channels 639, and handled by corresponding virtual device drivers (e.g., display driver 631, universal serial bus (USB) driver 633, disk driver 635, binder/inter-process communication (IPC) driver 637, camera driver 632, input driver 634, power management 636, and network driver 638, etc.). These "virtual" device drivers replace the drivers for a real device and communicate using QEMU and the SPICE protocol with a VC client application executing on the mobile device for access to the real devices and the services they provide.

Virtualization server software architecture 600 may further comprise a collection of libraries for accessing data, working with text and graphics, encryption and communication, and the underlying OS. In the case of Android® OS, each virtual device session includes a full complement of Android's® application framework, libraries, runtime, and applications. However, some kernel-based services provided within a virtual device server are modified. For example, power management services are simulated and significantly altered as battery support is not an issue in a virtual device. User interface (UI) indicators for batteries and other elements not applicable to the virtual device can be made to reflect the values of the client device.

As another example, applications running in a virtual device do not use the local device's Wi-Fi® or data network. Instead, they use the Internet Protocol (IP)-based network services provided by the virtual device servers. In some embodiments, an "always-on" network interface may be provided to the applications. Wi-Fi 33® and data connectivity management applications the user may install in the virtual device may have no relevance.

Virtualization server software architecture 600 may include additional virtual drivers not shown in FIG. 6. Many of the virtual drivers may communicate with a VC client application running on a mobile device using extensions to the SPICE protocol. Some are designed to improve performance whereas others provide access to features expected in a mobile device. Some example virtual drivers are further described below.

Virtual sensors driver—provides access to the remote client's sensor devices such as the GPS, the gyroscope, the accelerometer, a compass, battery level, Wi-Fi 33® signal strength, and 3G/4G signal strength. Other sensor types can be added as needed.

When an application requests access to a sensor such as the GPS, the sensors driver sends a device message that results in a sensor request being sent to the remote client. The remote client application then makes a similar request to the physical device and begins forwarding sensor data back to the sensor driver as the sensor produces data. When the application no longer needs the sensor information, a close request is sent back to the client where it then stops monitoring the specified sensor.

Some sensors, such as the GPS, can draw significant battery power while running. To prevent unnecessary battery drain, the VC client application running on the physical mobile device can request that the GPS on the local mobile device be turned on or off based on the requirements of applications running on the virtual device in the VC system.

Some sensors such as the accelerometer may change values very frequently. The VC client application can be configured to sample and relay accelerometer values from the local physical device based on attributes and requirements of the app running on the virtual device in the VC system as well as the performance of the network connection between the local and virtual devices (higher network latency and lower available bandwidth result in fewer sensor values being communicated).

A specific example of this is in how the VC system synchronizes the orientation of the remote virtual device to the orientation of the local device by continually monitoring and relaying orientation change events on the accelerometer on the local device, while not relaying every minor rotation of the device all the time even if the application on the remote virtual device is not monitoring the accelerometer data.

Additional sensors that the VC system can remote from the local device to the virtual device may include the network type, network signal strength, battery charge remaining, light sensor (used for screen diming), Bluetooth®, peripheral device connectivity and the state of any local payment credential.

Virtual touchscreen driver—supports remoting of multi-touch actions and also gestures. Multi-touch gestures can be used for zooming, rotating and other similar operations. In one embodiment, the SPICE mouse channel may be modified for this purpose. In some embodiments, a designated channel is used for this purpose.

Audio and video bypass driver—improves the performance of audio and video processing for both the VC server and the VC client. While embodiments can work without bypass, there is a CPU cost on both the client and the server when using the internal video processing of the host operating system (e.g., Android®). To this end, modified media framework 645 is provided to replace audio and video players that came with the OS with special players that implement the bypass functions. For example, when an application requests to play a video using the Android® video player (either full-screen or embedded), the bypass video player captures either the video data or an Universal Resource Locator (URL) that points to an address where the actual video file resides, and passes it via the bypass driver to the remote client. The client then spawns a local video player and plays the video stream. In the case of network video sources, the entire stream can be handled outside of the virtual device via a network proxy.

Audio bypass works much like video bypass. The audio player is replaced to provide proxy access to audio data in the client.

Virtual camera driver—remotes a camera using a combination of a virtual camera device driver and modifications to the camera functions in the media framework. When the camera activity or fragment is loaded in the virtual device, the modified camera viewer and virtual camera driver sends a request to the client to bring up the camera. Once a picture is taken, the picture or video is sent to the virtual device server where it can be placed in the flash storage of the virtual device or can be delivered to an anti-virus scanner and then placed in enterprise storage.

Virtual display driver—optimizes delivery of graphics to a remote client. More specifically, the graphics layer can be instrumented to generate messages via a virtual display driver instead of writing directly to a frame buffer. In some embodiments, surface manager 641 in libraries 640 is implemented to handle partial updates to the Android® display. In some embodiments, surface manager 641 may work in conjunction with graphics API 643 to provide acceleration for various commands issued by applications and the Android® OS.

These and other virtual drivers support remote access for applications 660 running on application frameworks 650 in the virtual device. Operation of the virtual device, including processes associated with applications 660, as well as user behaviors can be monitored via various components in application frameworks 650 (e.g., resource manager 651, location manger 653, agent 655, notification manager 657, activity manager 659, content providers 661, telephony manager 663, package manager 665, window manager 667, system view 669, Extensible Messaging and Presence Protocol (XMPP) communications service 671, etc.), some of which will be further described below.

As described above, a physical mobile device is separated from applications, which are run on protected hardware and software in a data center where they can be managed, monitored, repaired, and deployed under the care of information technology (IT) experts and administrators. To better understand the techniques described it is useful here to illustrate an embodiment of the implementation of a virtual mobile device in association with a client mobile device (e.g., a physical mobile device) utilized in association with a Bluetooth® enabled device.

As Turning now to FIG. 7, a physical mobile device 790 has a VC client application 730 (also referred to just as the client application) installed thereon as discussed. While the VC client application 730 may be specific to the device 790 or operating system of the device 790, for the purposes of this description an exemplary Android® environment will be used. Other examples and environments are also possible and may be utilized with embodiments as described herein such as, for example, Windows® or iOS®, as one skilled in the art will understand.

As mentioned above, the physical mobile device 790 is separated from applications 760, which are run on a virtual device 710 (e.g., on the operating system of the virtual device 710) using protected hardware and software where they can be managed, monitored, repaired, and deployed under the care of information technology (IT) experts and administrators. In some embodiments, the VC client application 730 collects events from the physical mobile device 790 and transmits information relating to the events to the virtual device 710. The events can be processed by an agent 755 on the virtual device 710 and provided to a corresponding application 760 executing on the virtual device 710 by event relay 757. In turn, the application 760 or libraries or drivers on the virtual device 710 provide events to the agent 755, which forms corresponding events and sends them to the VC client application 730 on the mobile device 790. The VC client application 730 then takes action based on the received events, including for example providing output through the mobile device 790, such as through the rendering of graphical displays using the graphics stack of the operating system of the mobile device 790.

The applications 760 executing on the virtual device 710 may be unaware of their execution environment. From their perspective, the virtual device 710 mirrors the corresponding physical mobile device 790. Therefore, these applications 760 may wish to use aspects or features of a physical mobile device 790 or the operating system executing thereon, despite that the applications 760 are actually executing on a virtual device 710 (e.g., or on the operating system used for such a virtual device 710).

In particular, one or more of these applications 760 may be Bluetooth® enabled, meaning that the application may wish to discover Bluetooth® enabled devices 766, connect with discovered Bluetooth® enabled device 766 or exchange data with a bonded or paired Bluetooth® enabled device 766. To accomplish this Bluetooth® bonding and data exchange, the application 760 may issue a set of calls to discover Bluetooth® enabled devices 766, to pair with a Bluetooth® enabled device 766, to connect with a Bluetooth® enabled device 766 or to read or write data to a data stream for a connected Bluetooth® enabled device 766. Specifically, Bluetooth® implementation 750 of the virtual device 710 may include portions in the application framework, operating system, libraries or core drivers on the virtual device 710 as discussed above with respect to FIG. 6. For example, the Bluetooth® service 754 of the Bluetooth® implementation 750 may be accessed through Bluetooth® APIs 752 that are substantially equivalent to standard Bluetooth® APIs on the operating system (e.g., the Android® Bluetooth® API android.bluetooth.*®).

The Bluetooth® service 754 implemented on the virtual device 710 may operate in association with agent 755 to manage Bluetooth® connections between application 760 and Bluetooth® enabled device 766. For example, the Bluetooth® service 754 or other modules of the Bluetooth® implementation 750 may operate to process calls issued by the application 760 associated with a Bluetooth® connection such that appropriate events may be issued to client application 730 on the mobile device 790 for that connection. The Bluetooth® service 754 may also process events generated by the client application 730 associated with a Bluetooth® connection such that appropriate data may be returned to the appropriate application 760 associated with that physical Bluetooth® connection on the virtual device 710.

Accordingly, Bluetooth® calls issued by an application 760 on the virtual device 710 are passed through the agent 755 on the virtual device 710 to the client application 730 on the mobile device 790 (e.g., using events issued by the agent 755 to the client application 730). The client application 730 can then utilize a Bluetooth® module 732 to pass the call on to the Bluetooth® implementation 780 on the mobile device 790 (e.g., through the Bluetooth® API 782 on the mobile device 790). A Bluetooth® connection can then be established between the client application 730 on the mobile device 790 and the Bluetooth® enabled device 766. Specifically, the Bluetooth® implementation 780 on physical mobile device 790 establishes an encryption key for use with Bluetooth® enabled device 766 and communications between the Bluetooth® device 766 and the physical device 790 are encrypted with this key. Thus, data transmitted over that Bluetooth® connection between the Bluetooth® enabled device 766 and the client application 730 is encrypted according to the Bluetooth® protocol implemented.

In particular, data written by the application 760 to an output stream at the virtual device 710 associated with that Bluetooth® connection is transmitted from the agent 755 on the virtual device 710 to the client application 730, where it is written to a corresponding output stream maintained by the Bluetooth® module 732 on the mobile device 790 through the Bluetooth® API 782. The data is encrypted by the Bluetooth® implementation 780 on the mobile device 790 and transmitted using the radio of the mobile device 790 to the Bluetooth® enabled device 766 according to the Bluetooth® protocol. Similarly, when data is received from the Bluetooth® enabled device 766 it is decrypted by the Bluetooth® implementation 780 on the physical device 790 such that it can be read by the Bluetooth® module 732. The Bluetooth® module 732 will read this unencrypted data from the corresponding input stream when such a read command is received from the agent 755 in response to a read call to the input stream from the application 760 utilizing the Bluetooth® connection.

As can be seen, then, while data from the Bluetooth® enabled device 766 is encrypted according to the Bluetooth® protocol when it is communicated between the Bluetooth® implementation 780 and the Bluetooth® enabled device 766, this data is in the clear (e.g., in a decrypted form) as it is passed between the Bluetooth® implementation 780 on the physical mobile device 790 and the client application 730. While the data may be encrypted (e.g., according to Transport Layer Security (TLS) or Secure Sockets Layer (SSL)) as it is passed between the client application 730 on the physical device 790 and the agent 755 of the virtual device 710, this brief window where the data is in the clear may still present security hazards for certain ecosystems. If the physical device 790 has been compromised then this unencrypted data may be intercepted during this communication and likewise compromised.

It would therefore be desirable if Bluetooth® encryption could be maintained between the Bluetooth® enabled device 766 where the data originates (or where the data is destined) and the endpoint destination (or originating endpoint). In the context of the virtual mobile device platform, then, it would be desirable if the data could remain encrypted between the Bluetooth® enabled device 766 and the virtual mobile device 710 or agent 755 thereon. In other words, it would be desirable if the virtual device 710 (or agent 755) could serve as the endpoint for encrypted Bluetooth® communications that occur over a connection with Bluetooth® enabled device 766 that was initiated by application 760 executing on virtual device 710, despite that the radio on physical mobile device 790 is used to receive and transmit the data according to the Bluetooth® protocol.

To accomplish that, in one embodiment, Bluetooth® implementation 780 on mobile device 790 may include one or more interfaces to facilitate endpoint to endpoint secure Bluetooth® cryptography. In particular, in one embodiment Bluetooth® implementation 780 on mobile device 790 may provide a connection or key exchange capability and associated interface 786. These interfaces may include a connection or key exchange interface such that the pairing, connection or other key exchange communications for the Bluetooth® protocol being utilized may be passed through the Bluetooth® implementation 780 on the physical mobile device 790, allowing identification, pairing, connection or key exchange to be performed directly between the two endpoints (e.g., using the radio of the physical mobile device 790 or low level software or firmware) without the participation of the Bluetooth® implementation 780 on the physical device 790 in this portion of the connection process.

In particular, these key exchange interfaces 786 may correspond to interfaces in a standard Bluetooth® implementation but may pass the data of the call (or responses returned in the call) back and forth such that the key exchange protocol utilized by the Bluetooth® implementation 750 on the virtual device and the Bluetooth® implementation on the Bluetooth® enabled device 766 (e.g., Diffie-Hellman such as Elliptic Curve Diffie-Hellman (ECDH), or other type of key exchange protocol) may perform the key exchange protocol directly between the two endpoints. Thus, for example, the key exchange interface 786 may include a RAWcreateBond interface or a RAWcreateRfcommSocketToServiceRecord. In this manner, when a Bluetooth® connection is being established between an application 760 (on the virtual mobile device 710) and the Bluetooth® enabled device 766, the Bluetooth® implementation 750 on the virtual device 710 and the Bluetooth® enabled device 766 can exchange any keys or key data needed to establish a paring or connection between the Bluetooth® implementation 750 on the virtual device 710 and the Bluetooth® enabled device 766.

Accordingly, when an application 760 at the virtual mobile device 710 desires to pair or connect with the Bluetooth® device 766 it may issue one or more standard Bluetooth® library API calls using Bluetooth® API 752 (e.g., such as a createBond or createRfcommSocketToServiceRecord call) on the virtual device 710. The Bluetooth® implementation 750 on the virtual device 710 is configured to inform the agent 755 on the virtual device 710 of this call. Based on the request from the Bluetooth® implementation 750 the agent 755 may construct an associated event for the original call and send the event to the VC client application 730 on the mobile device 790. The agent 755 will determine the event to be a Bluetooth® event and provide this Bluetooth® event to the Bluetooth® module 732 of the client application 730.

The Bluetooth® module 732 of the client application 730 at the physical mobile device 790 issues a corresponding call to the key exchange interface 786, where the issue call corresponds to the original call issued by the application (as received in the event) along with any arguments or parameters to the call (e.g., again as received in the event). The Bluetooth® implementation 780 at the mobile device 790 is configured to perform the same operations and procedures that would normally occur when the equivalent standard interface is called (e.g., form and transmit associated packets to the Bluetooth® enabled device 766). When any response is received from the Bluetooth® enabled device 766 the raw data received in that response may be provided by the Bluetooth® implementation 780 to the Bluetooth® module 732 in response to the call to the equivalent raw interface provided by the raw key exchange interface 786.

When the Bluetooth® module receives 732 at the client application 730 receives this raw data in response to the original call to the key exchange interface 786, it may return an event to the agent 755 on the virtual mobile device 710 with the raw data. When the raw data is received at the agent 755 it can be provided to the Bluetooth® implementation 750 on the virtual device 710 which can use the raw data in the same manner as a standard Bluetooth® implementation to implement the call originally received from the application 760 through the Bluetooth® API 752, including instantiating and returning any objects or other data to the calling application 760 in response to the original call. For example, a BluetoothSocket may be returned to the application by the Bluetooth® implementation 750. The raw key exchange interface may thus serve to allow data involved with this exchange or establishment to pass directly between Bluetooth® device 766 and Bluetooth® implementation 750 on the virtual device 710. In this manner, then, the key exchange or establishment that occurs with respect to the establishment of a Bluetooth® connection may take place directly between the Bluetooth® implementation 750 on the virtual device 710 and the Bluetooth® enabled device 766.

As the key exchange or key establishment has thus taken place between the Bluetooth® implementation 750 on the virtual device 710 and the Bluetooth® enabled device 766, the keys used for such encryption may be resident (e.g., only) at the virtual device 710 and the Bluetooth® enabled device 766. Accordingly, when the application 760 writes data to a Bluetooth® output stream or socket, the data may be encrypted by the Bluetooth® implementation 750 at the virtual device 710. Similarly, when data is written to an output stream by the Bluetooth® device 766 that data may be encrypted by the Bluetooth® device 766. As the key exchange has taken place between the Bluetooth® implementation 750 on the virtual device 710 and the Bluetooth® enabled device 766, the Bluetooth® implementation 780 on the mobile device 790 cannot decrypt such data. Moreover, any encryption or decryption that would be performed by the Bluetooth® implementation 780 on the mobile device 790 would create garbage data that would not result in the proper data when decryption attempts are made by the endpoints of the Bluetooth® implementation 750 at the virtual device 710 or the Bluetooth® enabled device 766.

Accordingly, in one embodiment Bluetooth® API 782 on the mobile device 790 also includes raw data interfaces 788. These interfaces 788 may allow the reading or writing of data from an input or output stream without any encryption or decryption being performed by the Bluetooth® implementation 780 on the mobile device 790. In other words, data may be written to an output stream using the raw data interface 788 such that this data may be passed through the Bluetooth® implementation 780 on the physical mobile device 790 and sent to the Bluetooth® enabled device 766 without encryption being performed by the Bluetooth® implementation on the physical mobile device 790.

In particular, these raw data interfaces 788 may correspond to interfaces in a standard Bluetooth® library but may pass the data of the call (or responses returned in the call) back and forth without performing encryption or decryption. Thus, for example, the raw data interface 788 may include a RAWread interface or RAWwrite interface. In this manner, when data is written to an output stream using the RAVV-write interface this data may be transmitted to the Bluetooth® enabled device 766 by the Bluetooth® implementation 780 on the mobile device 790 without any encryption of the written data being performed by the Bluetooth® implementation 780. Similarly, when data is received from the Bluetooth® enabled device 766 at the Bluetooth® implementation 780 on the mobile device 790 it may be placed in an output stream without decryption being performed by Bluetooth® implementation 780 on the mobile device 790. The raw data returned by the Bluetooth® enabled device 766 can thus be provided in response to a RAWread call to that output stream.

To illustrate, when application 760 on the virtual device 710 writes to an output stream, a call to the standard Bluetooth® write interface provided by Bluetooth® API 752 of Bluetooth® implementation 750 on the virtual device 710 may be issued by the application 760. The Bluetooth® implementation 750 on the virtual device 710 is configured to inform the agent 755 on the virtual device 710 of this write call. Specifically, the Bluetooth® implementation 750 on the virtual device 710 may encrypt the data using the key established previously with the Bluetooth® enabled device 766 (as described above). The notification can thus include the encrypted data and, for example, an identifier for a Bluetooth® enabled device 766 (such as a UUID) or other identifiers associated with a socket or output stream.

Based on the notification from the Bluetooth® implementation 750 the agent 755 may construct an associated event for the original write call including the encrypted data and send the event to the VC client application 730 on the mobile device 790, where it is determined to be a Bluetooth® event and provided to the Bluetooth® module 732. The Bluetooth® module 732 issues a RAWwrite call to the raw data interfaces 788 corresponding to the original call issued by the application 760 (as received in the event) along with the data (e.g., here the encrypted data as received in the event). The Bluetooth® implementation 780 at the mobile device 790 is configured to perform the similar operations and procedures to those that would normally occur when the equivalent standard write interface is called (e.g., form and transmit associated packets to the Bluetooth® enabled device 766 with the data) without performing any encryption on the data. The data encrypted by the Bluetooth® implementation 750 can thus be passed through the Bluetooth® implementation 780 on the mobile device 790 to the Bluetooth® enabled device 766 without further encryption such that it can be properly decrypted by the Bluetooth® enabled device 766.

Similarly, when application 760 on the virtual device 710 reads from an input stream, a call to the standard Bluetooth® read interface provided by Bluetooth® API 752 of Bluetooth® implementation 750 on the virtual device 710 may be issued by the application 760. The Bluetooth® implementation 750 on the virtual device 710 is configured to inform the agent 755 on the virtual device 710 of this read call. The notification can include, for example, an identifier for a Bluetooth® enabled device 766 (such as a UUID) or other identifiers associated with a socket or input stream. Based on the notification from the Bluetooth® implementation 750, the agent 755 may construct an associated event for the original read call and send the event to the VC client application 730 on the mobile device 790, where it is determined to be a Bluetooth® event and provided to the Bluetooth® module 732.

The Bluetooth® module 732 issues a RAWread call to the raw data interfaces 788 corresponding to the original call issued by the application 760 (as received in the event). The Bluetooth® implementation 780 at the mobile device 790 is configured to perform the similar operations and procedures to those that would normally occur when the equivalent standard read interface is called (e.g., receive associated packets from the Bluetooth® enabled device 766 and place the data in an input buffer) without performing any decryption on the data. The data encrypted by the Bluetooth® enabled device 766 can thus be passed through the Bluetooth® implementation 780 on the mobile device 790 to the Bluetooth® module 732 of the client application 730 without any decryption being performed by the Bluetooth® implementation 780 on the mobile device 790.

When the (raw encrypted) data is received at the Bluetooth® module 732 in response to the RAWread command, the data received in that response is returned in an event to the agent 755. When the data is received at the agent 755 it can be provided to the Bluetooth® implementation 750 on the virtual device 710 which can decrypt the data using the key established previously with the Bluetooth® enabled device 766 (as described above). The decrypted data can then be provided to the application 760 in response to the originally issue read call.

Accordingly, embodiments as disclosed herein may achieve the advantage of increasing the security of Bluetooth® communications, as data communicated over the Bluetooth® channel may not exist in an unencrypted form anywhere outside the endpoints of the communication channel (e.g., such as when being passed from the Bluetooth® implementation on the physical device to an application on the physical device).

Embodiments may be better explained with reference to FIGS. 8A-8D which are diagrams depicting embodiments of data flows between a Bluetooth® enabled device and a virtual device. In particular, in certain embodiments the virtual mobile device platform 802 includes a virtual device 810 on the virtual mobile device platform 802. An operating system (e.g., such as Android® or the like) is executing on the virtual device 810, and an application 812 may be executing on the operating system of the virtual device 810, as discussed. The virtual device 810 also includes a Bluetooth® implementation 814.

The virtual device 810 on the virtual mobile device platform 802 is associated with, and communicates over a network (e.g., the Internet, a LAN, a WAN, a wireless or wired network, a cellular network, or some combination of networks) with, a corresponding physical device 890. The physical device 890 includes a virtualization client application 830 executing on the device 890 and a Bluetooth® implementation 880.

As has been discussed, the virtual mobile device platform 802 may include an agent, event relay or other instructions (collectively referred to hereinafter as an agent). In some embodiments, the client application 830 collects events from the physical mobile device 890 and transmits information relating to the events to the virtual device 810 over the network. The events can be processed by the agent on the virtual device 810 and provided to a corresponding application 812 executing on the virtual device 810. In turn, the application 812 or libraries or drivers on the virtual device 810 provide events to the agent, which forms corresponding events and sends them to the client application 830 on the mobile device 890. The client application 830 then takes action based on the received events, including for example providing output through the mobile device 890 or interacting with the libraries, drivers or operating system of the mobile device 890.

The agent on the virtual mobile device platform 802 may thus be used to implement Bluetooth® operations, including for example, identifying, pairing, discovering, connecting or establishing a key between the Bluetooth® implementation 814 on the virtual device 810 and Bluetooth® enabled device 886 using the radio 834 of the physical device 890. Using this key then, data can be exchanged between the Bluetooth® implementation 814 on the virtual device 810 and the Bluetooth® device 886 using the radio 834 of the physical device 890, where the data is encrypted according to the Bluetooth® protocol using the key established between the Bluetooth® enabled device 886 and the Bluetooth® implementation 814 on the virtual device 810.

In particular, the Bluetooth® implementation 880 on the physical device 890 may provide a raw interface as discussed. The raw interface includes a raw key exchange interface that allows a Bluetooth® key to be determined between the Bluetooth® implementation 814 on the virtual device 810 and a Bluetooth® device 886 according to the Bluetooth® protocol (e.g., using the radio 834) of the mobile device 890. The raw interface may also include a raw data exchange interface that allows data to be sent to, or read from, the Bluetooth® enabled device 886 without encryption or decryption being performed by the Bluetooth® implementation 880 at the mobile device 890.

Specifically, application 812 may wish to discover Bluetooth® enabled device 886, connect with discovered Bluetooth® enabled device 886 or exchange data with a bonded or paired Bluetooth® enabled device 886. To accomplish this Bluetooth® bonding and data exchange, the application 812 may issue a set of calls to discover Bluetooth® enabled devices 886, to pair with a Bluetooth® enabled device 886, to connect with a Bluetooth® enabled device 886 or to read or write data to a data stream for a connected Bluetooth® enabled device 886. Specifically, Bluetooth® implementation 814 of the virtual device 810 may include portions in the application framework, operating system, libraries or core drivers on the virtual device 810 as discussed above. For example, Bluetooth® services of the Bluetooth® implementation 814 may be accessed through Bluetooth® APIs that are substantially equivalent to standard Bluetooth® APIs on the operating system (e.g., the Android® Bluetooth® API android.bluetooth.*®).

The Bluetooth® service 814 implemented on the virtual device 810 may operate in association with the agent to manage Bluetooth® connections between application 812 and Bluetooth® enabled device 886. For example, the Bluetooth® implementation 814 may operate to process calls issued by the application 812 associated with a Bluetooth® connection such that appropriate events may be issued to client application 830 on the mobile device 890 for that physical connection. The agent or Bluetooth® implementation 814 may also process events generated by the client application 830 associated with a Bluetooth® connection such that appropriate data may be returned to the appropriate application 812 on the virtual device 810 associated with that Bluetooth® connection.

Figure 8A:
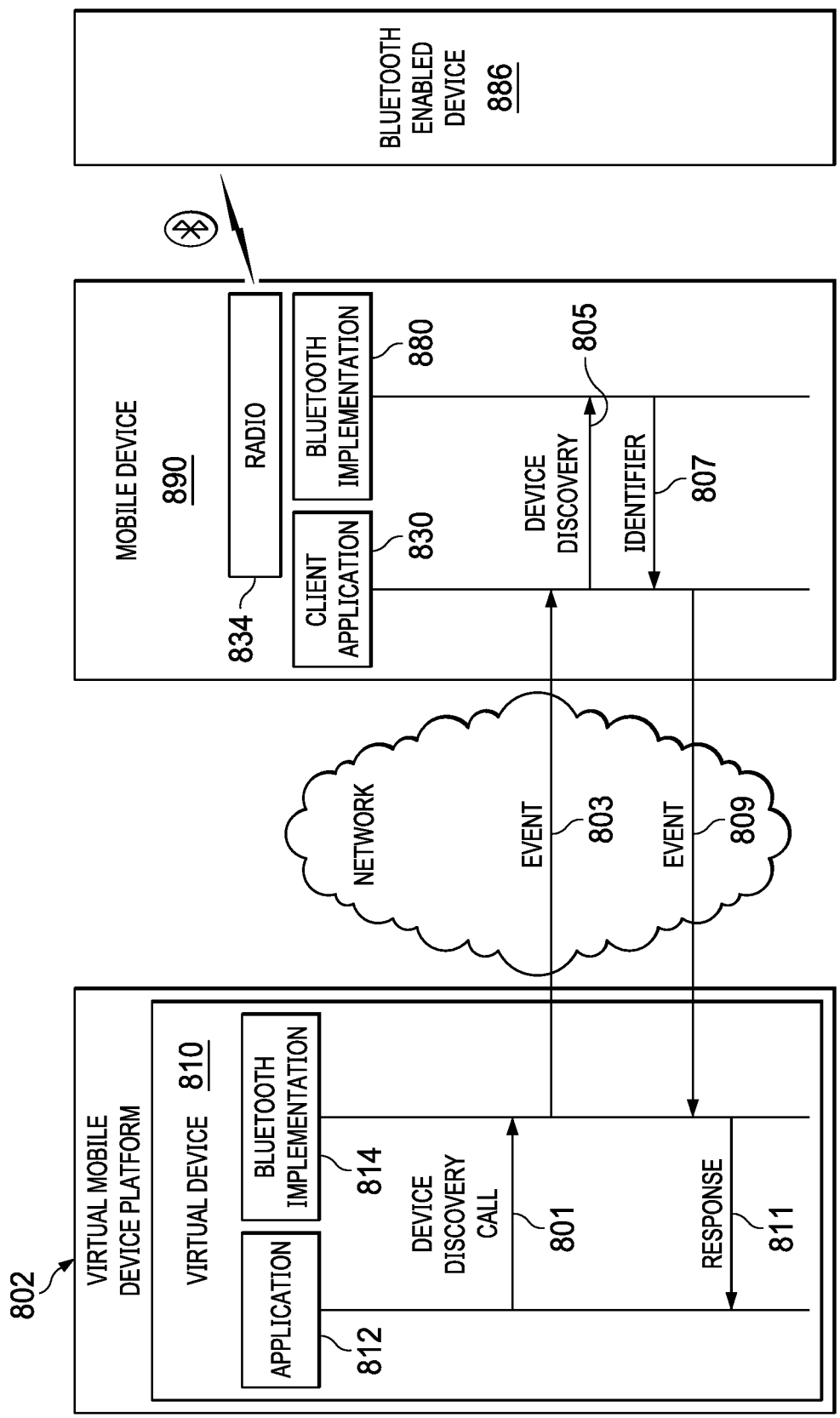
FIGS. 8A, 8B, 8C, and 8D depict diagrammatic representations of embodiments of data flow between a virtual device and a Bluetooth® enabled device.

Referring specifically to FIG. 8A, to discover an available Bluetooth® device, the application 812 on the virtual device may issues a Bluetooth® device discovery call (801) to the first Bluetooth® implementation 814. When this Bluetooth® discovery call (801) is received by the Bluetooth® implementation 814, an event (803) is created for the device discovery call at the virtual device and sent to the virtualization client application 830 at the mobile device 890. The virtualization client application 830 receives the event (803) and issues a device discovery call (805) to the Bluetooth® implementation 880 on the mobile device 890.

The Bluetooth® implementation 890 on the mobile device 890 discovers Bluetooth® enabled device 886 using the radio 834 on the mobile device and returns an identifier (807) for the Bluetooth® enabled device 886 to the client application 830 on the mobile device 890. The client application 830 creates an event (809) with the identifier and returns the event (809) to the virtual mobile device 810. The Bluetooth® implementation 814 on the virtual device 810 receives the event (809) or identifier from the event (809) and returns the identifier to the application 812 by responding (811) to the Bluetooth® device discovery call (801) issued by the application 812.

Figure 8B:
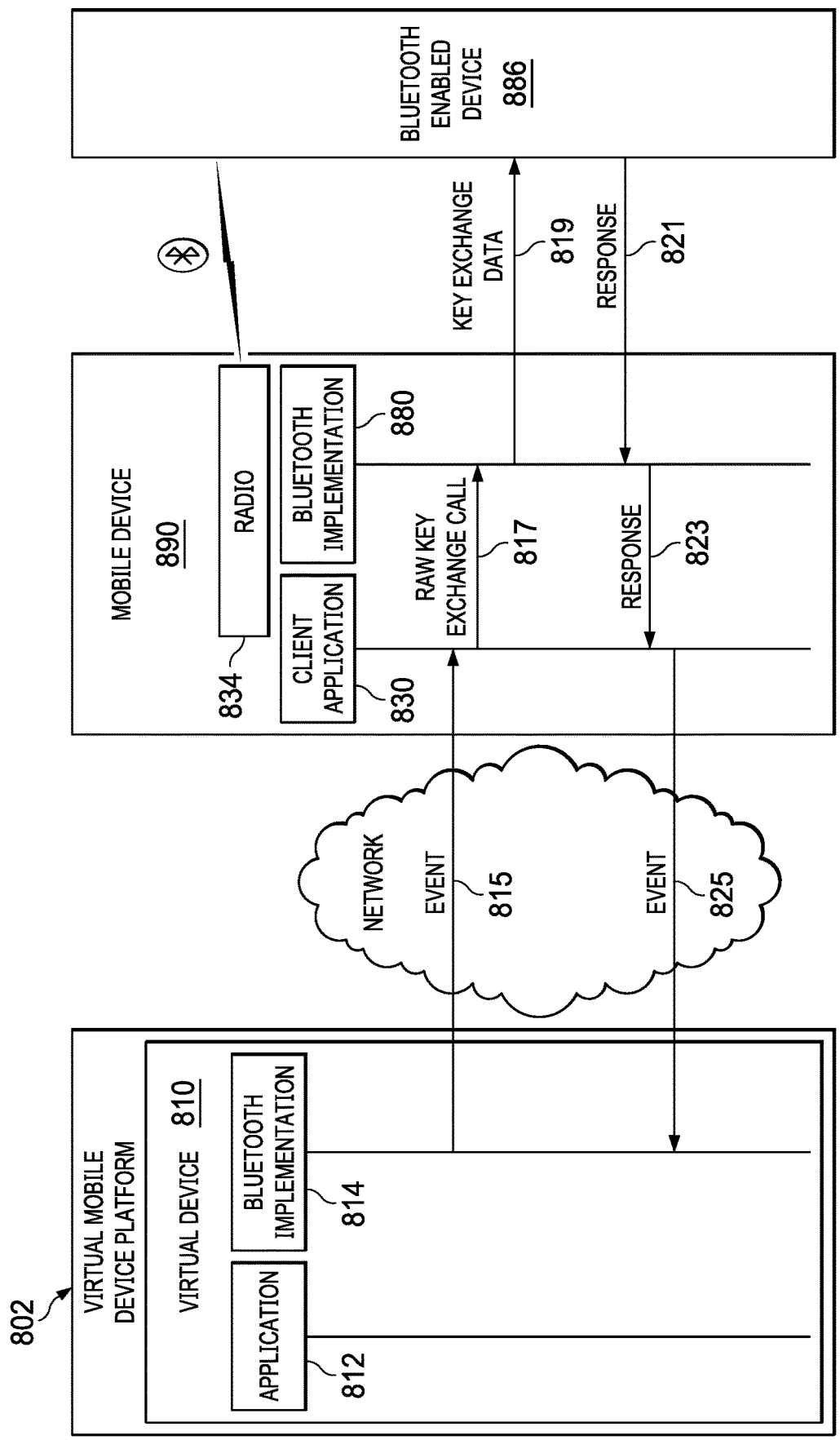

Moving on to FIG. 8B, a flow diagram depicting the key establishment or exchange between the Bluetooth® implementation on the virtual device and a Bluetooth® enabled device is presented. Here, a Bluetooth® key exchange may be initiated by the Bluetooth® implementation 814. An event (815) is created for the key exchange at the virtual device 810 and sent to the virtualization client application 830 at the mobile device 890.

The virtualization client application 830 receives the event (815) and issues a raw key exchange call (817), including key exchange data received in the event (815), to the raw key exchange interface of the Bluetooth® implementation 880 on the mobile device 890. The Bluetooth® implementation 814 sends the key exchange data (819) to the Bluetooth® enabled device using the radio 834 on the mobile device 890, and receives key exchange data from the Bluetooth® enabled device 886 in response (821). This key exchange data is provided from the Bluetooth® implementation 880 to the client application 830 in a response (823) to the call (817 to the raw key exchange interface of the Bluetooth® implementation 880. The client application then creates an event with this key exchange data and returns the event (825) to the virtual mobile device 810. The Bluetooth® implementation 814 on the virtual device 810 uses this key exchange data to establish a key (e.g., directly) with the Bluetooth® enabled device 886 such that data can be encrypted or decrypted with this key by Bluetooth® implementation 814 at the virtual device 810 or by the Bluetooth® enabled device 886.

Figure 8C:
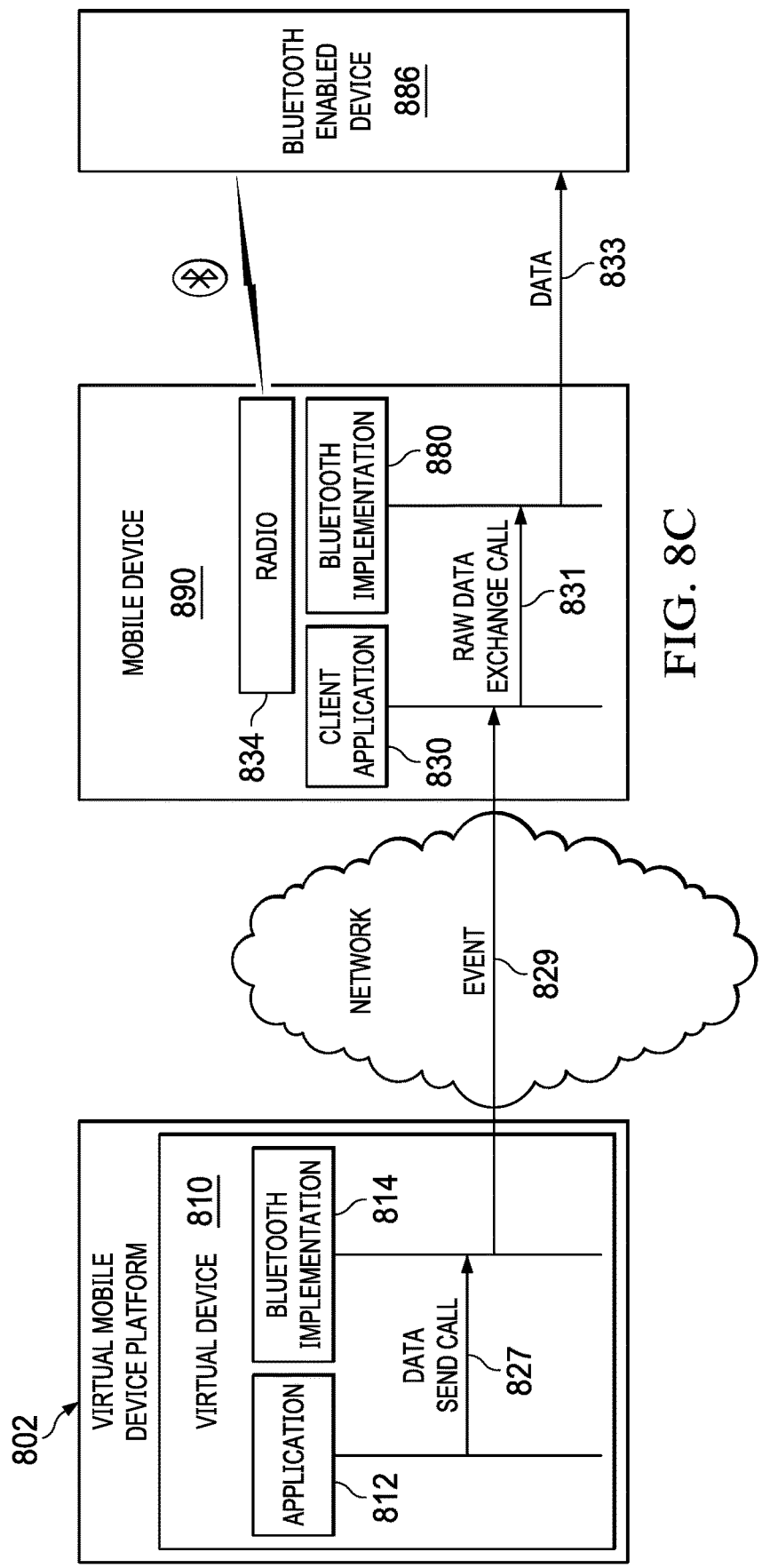

Now referring to FIG. 8C, a flow diagram depicting the sending of data between the Bluetooth® implementation on the virtual device and a Bluetooth® enabled device is presented. Here, the application 812 on the virtual device 810 issues a Bluetooth® data send call (827) including data to be sent to the Bluetooth® implementation 814. When this Bluetooth® data send call (827) is received by the Bluetooth® implementation 814, an event (829) is created for the data send call at the virtual device 810 and sent to the virtualization client application 830 at the mobile device 890. This event includes the data of the data send call (827) as encrypted by the Bluetooth® implementation 814 using the previously established key.

The virtualization client application 830 receives the event (829) and issues a raw data exchange call (831), including the encrypted data from the Bluetooth® data send call (827) received in the event (829), to the raw data exchange interface of the Bluetooth® implementation 880 on the mobile device 890. The Bluetooth® implementation 814 on the mobile device 890 sends this encrypted data (833) to the Bluetooth® enabled device 886 using the radio 834 on the mobile device 890 without performing any encryption on the data.

Figure 8D:
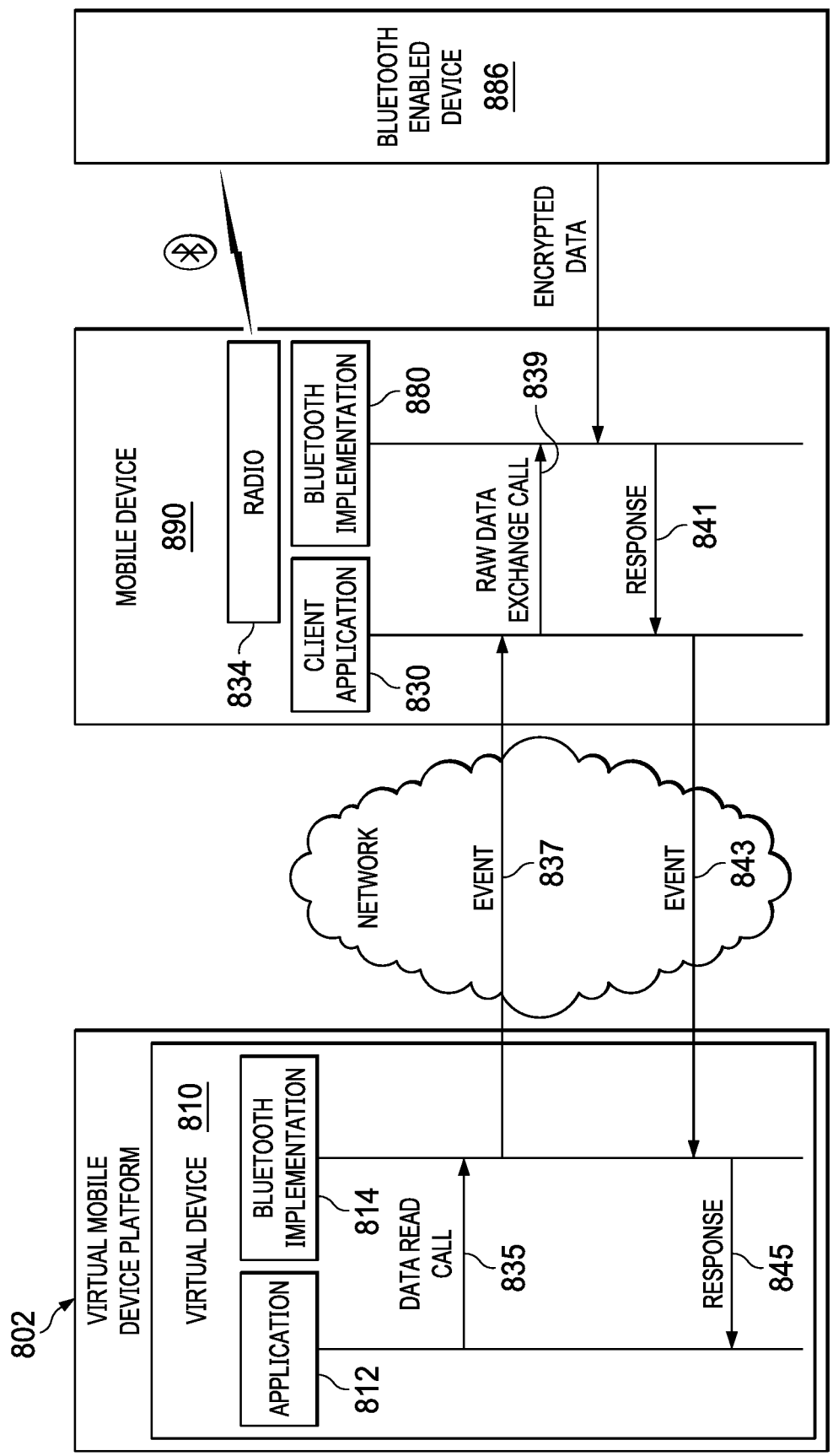

Looking now at FIG. 8D, a flow diagram depicting the reading of data between the Bluetooth® implementation on the virtual device and a Bluetooth® enabled device is presented. Here, the application 812 on the virtual device 810 issues a Bluetooth® data read call (835) to the Bluetooth® implementation 814. This data read call may, for example, identify a socket or input stream. When this Bluetooth® data read call (835) is received by the Bluetooth® implementation 814, an event (837) is created for the data read call at the virtual device 810 and sent to the virtualization client application 830 at the mobile device 890. This event (837) may include an identification of the socket or input stream identified in the data read call (835).

The virtualization client application 830 receives the event (837) and issues a raw data exchange call (839), which may include the identifier for the socket or input stream received in the event (837), to the raw data exchange interface of the Bluetooth® implementation 880 on the mobile device 890. The Bluetooth® implementation 814 on the mobile device 890 returns data in response (841) to this raw data call (839). This data may be associated with the identified socket or input stream that may be stored, for example, in memory such as a buffer or the like, by the Bluetooth® implementation 880 at the mobile device 890. This data may have been previously received from the Bluetooth® enabled device 886 (or may be obtained when the raw data call is received) and may have been encrypted by the Bluetooth® enabled device 886 (e.g., according to the previously established key between the Bluetooth® implementation 814 and Bluetooth® enabled device 886). This (encrypted data) can thus be returned by the Bluetooth® implementation 880 on the mobile device 890 to the client application 830 in response (841) to the raw data exchange call (839) without decryption being performed on the encrypted data by the Bluetooth® implementation 880 at the mobile device.

The client application 830 may receive this data (841) and create an event (843) with the received encrypted data (e.g., as encrypted by Bluetooth® enabled device 886) and return this event (843) to the virtual mobile device 810. The Bluetooth® implementation 814 on the virtual device 810 can then decrypt the data included in the event (843) using the previously established key, and provide the decrypted data to the application 812 in a response (845) to the original Bluetooth® data read call (835) issued by the application 812.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As is known to those skilled in the art, a computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

What is claimed is:

1. A system for enabling secure communication between a virtual smartphone and a physical smartphone's Bluetooth accessory via the physical smartphone, the system comprising:
   a virtual device platform comprising a plurality of virtual devices, the plurality of virtual devices comprising the virtual smartphone executing a smartphone operating system via which a user interface of the virtual smartphone is generated, wherein the virtual device platform is coupled to the physical smartphone over the Internet, wherein the virtual device platform comprises one or more processors programmed with computer readable instructions that, when executed, cause the one or more processors to:
      cause a graphical representation of the user interface of the virtual smartphone to be presented on a touchscreen display of the physical smartphone, wherein the presentation of the graphical representation of the user interface of the virtual smartphone enables a user of the physical smartphone to interact with the user interface of the virtual smartphone via the touchscreen display of the physical smartphone;
      generate a first event and send, via the Internet, the first event to the physical smartphone, the first event including first key exchange data to connect the virtual smartphone implemented on the virtual device platform to the physical smartphone's Bluetooth accessory;
      obtain, via the Internet, a second event from the physical smartphone, the second event including second key exchange data to connect the virtual smartphone to the Bluetooth accessory, and the second key exchange data being obtained by the physical smartphone from the Bluetooth accessory via a wireless connection between the physical smartphone and the Bluetooth accessory;
      establish a key between the virtual smartphone and the Bluetooth accessory based on the obtained second event; and
      exchange encrypted data between the virtual smartphone implemented on the virtual device platform and the Bluetooth accessory via the physical smartphone by using the wireless connection between the physical smartphone and the Bluetooth accessory, wherein the data is encrypted using the key established between the Bluetooth accessory and the virtual smartphone.

2. The system of claim 1, wherein the physical smartphone allows the key to be determined between the virtual smartphone and the Bluetooth accessory according to a wireless connection protocol, and wherein the physical smartphone allows the data to be sent to, or read from, the Bluetooth accessory without encryption or decryption being performed on the data by the physical smartphone.

3. The system of claim 1, wherein the one or more processors are further caused to:
   generate a third event for a device discovery call and send, via the Internet, the third event to the physical smartphone; and
   obtain, via the Internet, a fourth event from the physical smartphone in response to the third event, the fourth event including an identifier for the Bluetooth accessory, and the identifier being obtained by the physical smartphone from the Bluetooth accessory via the wireless connection between the physical smartphone and the Bluetooth accessory.

4. The system of claim 1, wherein the one or more processors are further caused to:
   generate a fifth event for a Bluetooth data send call, wherein the fifth event includes the data encrypted by the virtual smartphone using the key established between the virtual smartphone and the Bluetooth accessory; and
   send, via the Internet, the fifth event including the encrypted data to the physical smartphone, wherein the fifth event including the encrypted data is exchanged between the virtual smartphone implemented on the virtual device platform and the Bluetooth accessory via the physical smartphone by using the wireless connection between the physical smartphone and the Bluetooth accessory, and wherein the fifth event including the encrypted data is sent from the virtual smartphone to the Bluetooth accessory via the physical smartphone without encryption being performed by the physical smartphone.

5. The system of claim 1, wherein the one or more processors are further caused to:
   generate a sixth event for a Bluetooth data read call, wherein the sixth event includes an identifier for a socket or input stream;
   send, via the Internet, the sixth event including the identifier for the socket or input stream to the physical smartphone;
   obtain, via the Internet and in response to the sixth event, a seventh event from the physical smartphone including other data received from the Bluetooth accessory using the wireless connection between the physical smartphone and the Bluetooth accessory, wherein the other data is encrypted using the key established between the virtual smartphone and the Bluetooth accessory and wherein the other encrypted data is obtained from the physical smartphone without decryption being performed on the other encrypted data by the physical smartphone; and decrypt the received other data using the key established between the virtual smartphone and the Bluetooth accessory.

6. The system of claim 1, wherein the established key is stored only in the virtual device platform and the Bluetooth accessory.

7. A method for enabling secure communication between a virtual mobile device and a physical mobile device's Bluetooth accessory via the physical mobile device, the method comprising:

providing a virtual device platform comprising a plurality of virtual devices, the plurality of virtual device comprising the virtual mobile device, wherein the virtual device platform is coupled to the physical mobile device over the Internet, the virtual device platform configured such that the virtual mobile device corresponds to the physical mobile device;

causing a graphical representation of a user interface of the virtual mobile device to be presented on a display of the physical mobile device, wherein the presentation of the graphical representation of the user interface of the virtual mobile device enables a user of the physical mobile device to interact with the user interface of the virtual mobile device via the display of the physical mobile device;

generating a first event and sending, via the Internet, the first event to the physical mobile device, the first event including first key exchange data to connect the virtual mobile device implemented on the virtual device platform to the physical mobile device's Bluetooth accessory;

obtaining, via the Internet, a second event from the physical mobile device, the second event including second key exchange data to connect the virtual mobile device to the Bluetooth accessory, and the second key exchange data being obtained by the physical mobile device from the Bluetooth accessory via a wireless connection between the physical mobile device and the Bluetooth accessory;

establishing a key between the virtual mobile device and the Bluetooth accessory based on the obtained second event; and exchanging encrypted data between the virtual mobile device implemented on the virtual device platform and the Bluetooth accessory via the physical mobile device by using the wireless connection between the physical smartphone and the Bluetooth accessory, wherein the data is encrypted using the key established between the Bluetooth accessory and the virtual mobile device.

8. The method of claim 7, wherein the physical mobile device allows the key to be determined between the virtual mobile device and the Bluetooth accessory according to a wireless connection protocol, and wherein the physical mobile device allows the data to be sent to, or read from, the Bluetooth accessory without encryption or decryption being performed on the data by the physical mobile device.

9. The method of claim 7, further comprising:

generating a third event for a device discovery call and sending, via the Internet, the third event to the physical mobile device; and obtaining, via the Internet, a fourth event from the physical mobile device in response to the third event, the fourth event including an identifier for the Bluetooth accessory, and the identifier being obtained by the physical smartphone from the Bluetooth accessory via the wireless connection between the physical mobile device and the Bluetooth accessory.

10. The method of claim 7, further comprising:

generating a fifth event for a Bluetooth data send call, wherein the fifth event includes the data encrypted by the virtual mobile device using the key established between the virtual mobile device and the Bluetooth accessory; and sending, via the Internet, the fifth event including the encrypted data to the physical mobile device, wherein the fifth event including the encrypted data is exchanged between the virtual mobile device implemented on the virtual device platform and the Bluetooth accessory via the physical mobile device by using the wireless connection between the physical mobile device and the Bluetooth accessory, and wherein the fifth event including the encrypted data is sent from the virtual mobile device to the Bluetooth accessory via the physical mobile device without encryption being performed by the physical mobile device.

11. The method of claim 7, further comprising:

generating a sixth event for a Bluetooth data read call, wherein the sixth event includes an identifier for a socket or input stream;

sending, via the Internet, the sixth event including the identifier for the socket or input stream to the physical mobile device;

obtaining, via the Internet and in response to the sixth event, a seventh event from the physical mobile device including other data received from the Bluetooth accessory using the wireless connection between the physical mobile device and the Bluetooth accessory, wherein the other data is encrypted using the key established between the virtual mobile device and the Bluetooth accessory and wherein the other encrypted data is obtained from the physical mobile device without decryption being performed on the other encrypted data by the physical mobile device; and decrypting the received other data using the key established between the virtual mobile device and the Bluetooth accessory.

12. The method of claim 7, wherein the established key is stored only in the virtual device platform and the Bluetooth accessory.

13. A non-transitory computer readable medium comprising instructions for enabling secure communication between a virtual mobile device and a physical mobile device's Bluetooth accessory via the physical mobile device, the instructions for:

providing a virtual device platform comprising a plurality of virtual devices, the plurality of virtual devices comprising the virtual mobile device, wherein the virtual device platform is coupled to the physical mobile device over the Internet, the virtual device platform configured such that the virtual mobile device corresponds to the physical mobile device;

causing a graphical representation of a user interface of the virtual mobile device to be presented on a display of the physical mobile device, wherein the presentation of the graphical representation of the user interface of the virtual mobile device enables a user of the physical mobile device to interact with the user interface of the virtual mobile device via the display of the physical mobile device;

generating a first event and sending, via the Internet, the first event to the physical mobile device, the first event including first key exchange data to connect the virtual mobile device implemented on the virtual device platform to the physical mobile device's Bluetooth accessory;

obtaining, via the Internet, a second event from the physical mobile device, the second event including second key exchange data to connect the virtual mobile device to the Bluetooth accessory, and the second key exchange data being obtained by the physical mobile device from the Bluetooth accessory via a wireless connection between the physical mobile device and the Bluetooth accessory;

establishing a key between the virtual mobile device and the Bluetooth accessory based on the obtained second event; and exchanging encrypted data between the virtual mobile device implemented on the virtual device platform and the Bluetooth accessory via the physical mobile device by using the wireless connection between the physical mobile device and the Bluetooth accessory, wherein the data is encrypted using the key established between the Bluetooth accessory and the virtual mobile device.

14. The computer readable medium of claim 13, wherein the physical mobile device allows the key to be determined between the virtual mobile device and the Bluetooth accessory according to a wireless connection protocol, and wherein the physical mobile device allows the data to be sent to, or read from, the Bluetooth accessory without encryption or decryption being performed on the data by the physical mobile device.

15. The computer readable medium of claim 13, further comprising instructions for:

generating a third event for a device discovery call and sending, via the Internet, the third event to the physical mobile device; and obtaining, via the Internet, a fourth event from the physical mobile device in response to the third event, the fourth event including an identifier for the Bluetooth accessory, and the identifier being obtained by the physical mobile device from the Bluetooth accessory via the wireless connection between the physical mobile device and the Bluetooth accessory.

16. The computer readable medium of claim 13, further comprising instructions for:

generating a fifth event for a Bluetooth data send, wherein the fifth event includes the data encrypted by the virtual mobile device using the key established between the virtual mobile device and the Bluetooth accessory; and sending, via the Internet, the fifth event including the encrypted data to the physical mobile device, wherein the fifth event including the encrypted data is exchanged between the virtual mobile device implemented on the virtual device platform and the Bluetooth accessory via the physical mobile device by using the wireless connection between the physical mobile device and the Bluetooth accessory, and wherein the fifth event including the encrypted data is sent from the virtual mobile device to the Bluetooth accessory via the physical device without encryption being performed by the physical mobile device.

17. The computer readable medium of claim 13, further comprising instructions for:

generating a sixth event for a Bluetooth data read call, wherein the sixth event includes an identifier for a socket or input stream;

sending, via the Internet, the sixth event including the identifier for the socket or input stream to the physical device;

obtain, via the Internet and in response to the sixth event, a seventh event from the physical mobile device including other data received from the Bluetooth accessory using the wireless connection between the physical mobile device and the Bluetooth accessory wherein the other data is encrypted using the key established between the virtual mobile device and the Bluetooth accessory and wherein the other encrypted data is obtained from the physical mobile device without decryption being performed on the other encrypted data by the physical mobile device;

and decrypting the received other data using the key established between the virtual mobile device and the Bluetooth accessory.

18. The computer readable medium of claim 13, wherein the established key is stored only in the virtual device platform and the Bluetooth accessory.

* * * * *